(12) United States Patent
Sahni et al.

(10) Patent No.: US 7,474,657 B2
(45) Date of Patent: *Jan. 6, 2009

(54) PARTITIONING METHODS FOR DYNAMIC ROUTER TABLES

(75) Inventors: Sartaj Kumar Sahni, Gainesville, FL (US); Haibin Lu, Gainesville, FL (US); Kun Suk Kim, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 994 days.

This patent is subject to a terminal disclaimer.

(21) Appl. No.: 10/718,842

(22) Filed: Nov. 21, 2003

(65) Prior Publication Data

US 2004/0141509 A1    Jul. 22, 2004

Related U.S. Application Data

(63) Continuation-in-part of application No. 10/426,423, filed on Apr. 30, 2003.

(60) Provisional application No. 60/376,853, filed on Apr. 30, 2002.

(51) Int. Cl.
*G06F 17/30* (2006.01)

(52) U.S. Cl. ........................ 370/392; 370/428

(58) Field of Classification Search ........... 370/392, 370/428
See application file for complete search history.

(56) References Cited

U.S. PATENT DOCUMENTS

| | | | |
|---|---|---|---|
| 4,251,861 A | 2/1981 | Mago | |
| 4,833,468 A | 5/1989 | Larson et al. | |
| 5,555,405 A | 9/1996 | Griesmer et al. | |
| 5,701,467 A | 12/1997 | Freeston | |
| 5,761,440 A | 6/1998 | De Marco et al. | |
| 5,787,430 A | 7/1998 | Doeringer et al. | |
| 5,909,440 A | 6/1999 | Ferguson et al. | |
| 6,018,524 A | 1/2000 | Turner et al. | |
| 6,021,131 A | 2/2000 | Even | |
| 6,041,053 A | 3/2000 | Douceur et al. | |
| 6,061,712 A | 5/2000 | Tzeng | |
| 6,092,072 A | 7/2000 | Guha et al. | |
| 6,104,701 A | 8/2000 | Avargues et al. | |
| 6,157,955 A | 12/2000 | Narad et al. | |
| 6,212,184 B1 | 4/2001 | Venkatachary et al. | |
| 6,266,706 B1 | 7/2001 | Brodnik et al. | |
| 6,289,013 B1 | 9/2001 | Lakshman et al. | |
| 6,335,932 B2 | 1/2002 | Kadambi et al. | |
| 6,341,130 B1 | 1/2002 | Lakshman et al. | |

(Continued)

OTHER PUBLICATIONS

Afek, Y. et al. (Dec. 14, 1999) "Routing with a Clue" *ACM SIGCOMM.* pp. 203-214, (enclosed copy pages numbered 0-23).

(Continued)

*Primary Examiner*—Wing F Chan
*Assistant Examiner*—Jay P Patel
(74) *Attorney, Agent, or Firm*—Saliwanchik, Lloyd & Saliwanchik

(57) ABSTRACT

Systems and methods for improving the performance of dynamic router table data structures are provided. The invention relates to methods and systems for partitioning prefixes or prefix-based intervals. In one embodiment, priority search tree router data structures are applied to prefix partitions of the present invention. In another embodiment, basic-interval tree and prefix tree data structures are applied to interval partitions of the present invention.

10 Claims, 21 Drawing Sheets

U.S. PATENT DOCUMENTS

| | | | | |
|---|---|---|---|---|
| 6,353,873 | B1* | 3/2002 | Melchior | 711/108 |
| 6,392,842 | B1* | 5/2002 | Boutaghou et al. | 360/236.6 |
| 6,522,632 | B1 | 2/2003 | Waters et al. | |
| 6,563,823 | B1* | 5/2003 | Przygienda et al. | 370/392 |
| 6,611,832 | B1* | 8/2003 | van Lunteren | 707/3 |
| 2002/0009076 | A1 | 1/2002 | Engbersen et al. | |

OTHER PUBLICATIONS

Berg, M. (1995) "Two- and Three-dimensional Point Location in Rectangular Sub-divisions" *Journal of Algorithms*. vol. 18, No. 2, pp. 256-277.

Chandranmenon, G. and Varghese, G. (1996) "Trading Packet Headers for Packet Processing" *IEEE Transactions on Networking*. vol. 4, No. 2, pp. 141-152 (enclosed copy pages numbered 1-13).

Cheung and McCanne. (1999) "Optimal Routing Table Design for IP Address Lookups under Memory Constraints," *IEEE INFOCOM*. pp. 1437-1444.

Degermark, M. et al. "Small Forwarding Tables for Fast Routing Lookups" *ACM SIGCOMM Proceedings of the ACM SIGCOMM '97 Conference on Applications, technologies, architectures, and protocols for computer communication*. pp. 3-14.

Doeringer, W. et al. (1996) "Routing on Longest-matching Prefixes" *IEEE/ACM Transactions on Networking*. vol. 4, No. 1, pp. 86-97.

Ergun, F. et al. (2001) "A Dynamic Lookup Scheme for Bursty Access Patterns" *IEEE INFOCOM*. pp. 1-10.

Gupta, P. and N. McKeown. (2000) "Dynamic Algorithms with Worst-case Performance for Packet Classification." *IFIP Networking*. pp. 528-539.

Hari, A. et al. (2000) "Detecting and Resolving Packet Filter Conflicts" *IEEE INFOCOM*. pp. 1203-1212.

Lampson, B. et al. (1998) "IP Lookup using Multi-way and Multicolumn Search" *IEEE INFOCOM Transactions on Networking*. vol. 7, No. 3, pp. 324-334.

Macian, C. and R. Finthammer. (2001) "An Evaluation to the Key Design Criteria to Achieve High Update Rates in Packet Classifiers" *IEEE Network*. Nov./Dec., pp. 24-29 (enclosed copy pages numbered 1-10).

McAuley, A. and P. Francis.(1993) "Fast Routing Table Lookups Using CAMs" *IEEE INFOCOM*. vol. 3 Mar./Apr., pp. 1382-1391.

McCreight, E. (1985). "Priority Search Trees" *SIAM Jr. on Computing*. vol. 14, No. 1, pp. 257-276.

Newman, P. et al. (Jan. 1997) "IP Switching and Gigabit Routers" *IEEE Broadband Communications Magazine*. vol. 35, pp. 64-69 (enclosed copy pages numbered 1-8).

S. Nilsson and G. Karlsson (1998) "Fast Address Look-up for Internet Routers" *Proceedings of IEEE Broadband Communications*. (enclosed copy pages numbered 9-18).

Ruiz-Sanchez, M. et al. (2001) "Survey and Taxonomy of IP Address Lookup Algorithms" *IEEE Network*, Mar./Apr., vol. 15, No. 2, pp. 8-23.

S. Sahni and K. Kim. "Data Structures of IP Lookup with Bursty Access Patterns", www.cise.ufl.edu/~sahni. (enclosed copy pages numbered 1-5).

S. Sahni and K. Kim. (2001) "Efficient Construction of Fixed-Stride Multibit Tries for IP Lookup" *Proceedings $8^{th}$ IEEE Workshop on Future Trends of Distributed Computing Systems*. pp. 178-184 (enclosed copy pages numbered 1-7).

S. Sahni and K. Kim. (2002) "Efficient Construction of Variable-Stride Multibit Tries for IP Lookup." *Proceedings IEEE Symposium on Applications and the Internet (SAINT)*. pp. 220-229 (enclosed copy pages numbered 1-8).

S. Sahni and K. Kim. (2002) "O($\log n$) Dynamic Packet Routing." $7^{th}$ *IEEE Symposium on computers and communications*.

S. Sahni and K. Kim, H. Lu. (May 2002) "Data structures for one-dimensional packet classification using most-specific-rule matching." *International Symposium on Parallel Architectures, Algorithms, and Networks (ISPAN)*. pp. 3-14 (enclosed copy pages numbered 1-12).

K. Sklower. (1991) "A tree-based routing table for Berkeley Unix." *Proceedings of 1991 Winter USENIX Conference*. pp. 93-99 (enclosed copy pages numbered 1-4).

V. Srinivasan and G. Varghese. (1999) "Faster IP lookups using controlled prefix expansion." *ACM Transactions on Computer Systems*. vol. 17, issue 1, pp. 1-40 (enclosed copy pages No. 1-21).

Suri, S., G. Varghese, and P. Warkhede (2001) "Multiway range trees: Scalable IP lookup with fast updates." *Proceedings of Globecom '01*.

Waldvogel, Marcel et al. (1997) "Scalable High Speed IP Routing Lookups." *Proceedings of the ACM SIGCOMM '91 Conference on Applications, technologies, architectures, and protocols for computer communication*. pp. 25-36 (enclosed copy pages numbered 1-12).

\* cited by examiner

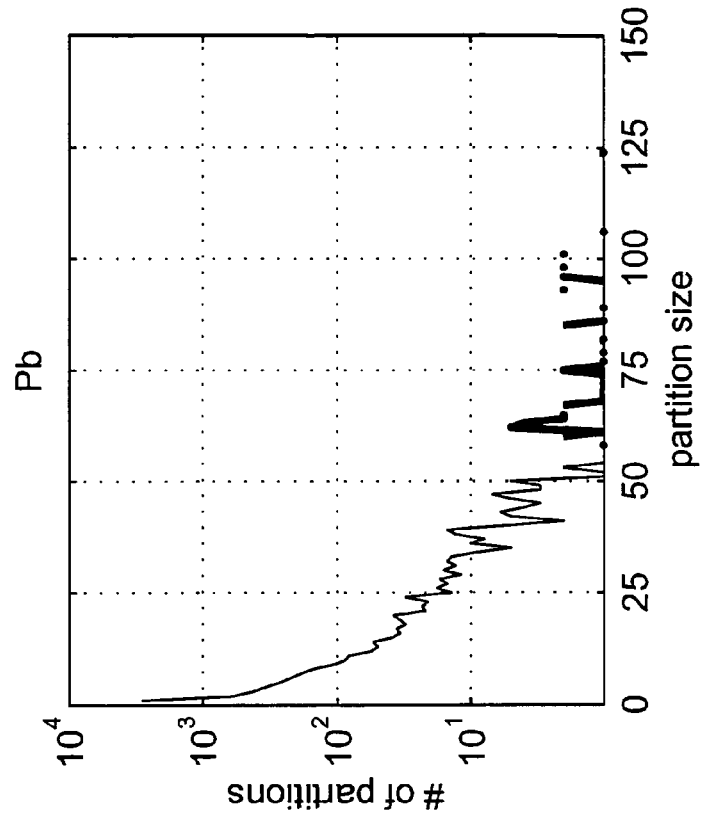
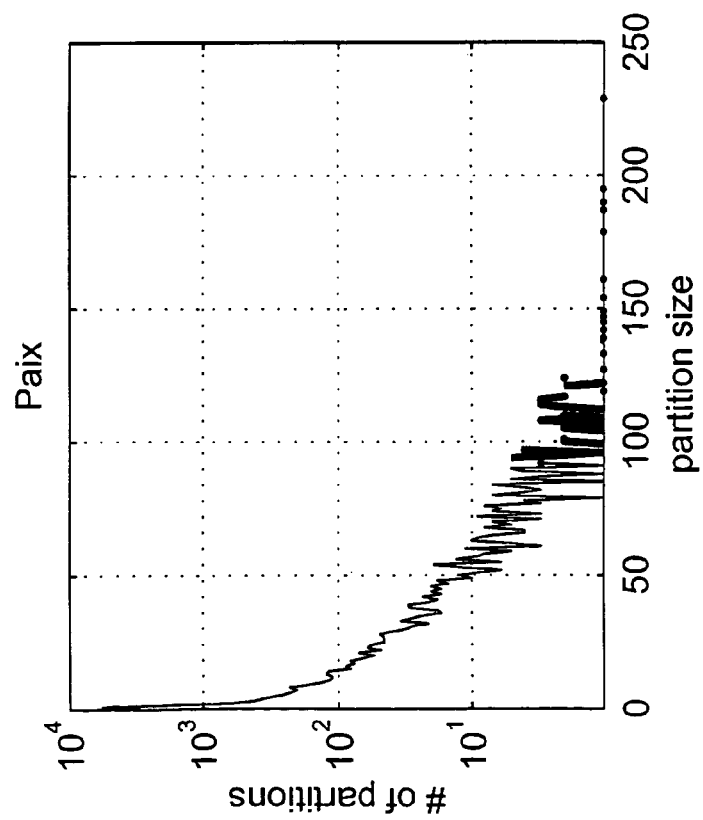
FIG. 2B
FIG. 2A

| | |
|---|---|
| $P1 = 0*$ | $000 * (P1a)$ |
| $P2 = 1*$ | $001 * (P1b)$ |
| $P3 = 11*$ | $010 * (P1c)$ |
| $P4 = 101*$ | $011 * (P1d)$ |
| $P5 = 10001*$ | $100 * (P2)$ |
| $P6 = 1100*$ | $101 * (P4)$ |
| $P7 = 110000*$ | $110 * (P3a)$ |
| $P8 = 1100000*$ | $111 * (P3b)$ |
| | $10001 * (P5)$ |
| FIG. 6A | $11000 * (P6a)$ |
| | $11001 * (P6b)$ |
| | $1100000 * (P8)$ |
| | $1100001 * (P7)$ |

PARTITIONING METHODS FOR DYNAMIC ROUTER TABLES

CROSS-REFERENCE TO RELATED APPLICATIONS

This application is a continuation-in-part application of co-pending U.S. application Ser. No. 10/426,423, filed Apr. 30, 2003; which claims the benefit of U.S. Provisional application No. 60/376,853, filed Apr. 30, 2002.

GOVERNMENT SUPPORT

This invention was made in part with funding under a funding grant, No. CCR9912395, from the National Science Foundation. The government has certain rights in the invention.

COPYRIGHT NOTICE

A portion of the disclosure of this patent document, including the Appendix, contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates to packet routing in dynamic router tables. More specifically, the invention relates to a method, computer system, and computer readable media for matching, inserting, and deleting rules in dynamic routing tables in $O(\log n)$ time.

BACKGROUND ART

With the doubling of Internet traffic every three months and the tripling of Internet hosts every two years, routers continuously need to increase packet forwarding rates while still allowing for quick adaptation to routing changes. Internet routers classify incoming packets into a set of packets that are to be treated similarly for routing purposes (also known as "flows") utilizing information contained in packet headers and a table of rules. This table is called the "rule table" or "router table." The packet-header information that is used to perform the classification is some subset of the source and destination addresses, the source and destination ports, the protocol, protocol flags, type of service, and so on. The specific header information used for packet classification is governed by the rules in the rule table.

Each rule-table consists of at least one tuple, which is a pair of the form (F,N), where F is a filter and N is the next action (i.e., hop) for the packet. Typically, each filter is a destination address prefix and longest-prefix matching is used to determine the next hop for each incoming packet. That is, when a packet arrives at a router, its next hop is determined by the rule that has the longest prefix (i.e., filter) that matches the destination address of the packet. Generally, the length of a router-table prefix cannot exceed the length W of a destination address. In IPv4, destination addresses are W=32 bits long, and in IPv6, W=128.

In a static rule table, the rule set does not vary in time. For these tables, problems are often associated with the time required to search the rule table for the rule to use; the preprocessing time needed to create the rule-table data structure; and the amount of memory required by the rule-table data structure. In practice, rule tables are seldom truly static. At best, rules are rarely added to or deleted from the rule table because the rule-table data structure has to be reconstructed whenever a rule is added or deleted.

In contrast, in a dynamic rule table, rules are added/deleted with some frequency. For such tables, inserts/deletes are not batched. Rather, they are performed in real time. For such tables, the time required to insert/delete a rule is a concern. For a dynamic rule table, the initial rule-table data structure is constructed by starting with empty data structures and then inserting the initial set of rules into the data structure one by one. Consequently, in the case of dynamic tables, the preprocessing time is very closely related to the insert time.

Several trie-based data structures for prefix-router tables have been proposed (Sklower, K., "A tree-based routing table for Berkeley Unix," Technical Report, University of California, Berkeley (1993); Degermark, M. et al., "Small forwarding tables for fast routing lookups," *ACM SIGCOMM*, 3-14 (1997); Doeringer, W. et al., "Routing on longest-matching prefixes," *IEEE/ACM Transactions on Networking*, 4, 1:86-97 (1996); Nilsson, S. and G. Karlsson, "Fast address look-up for Internet routers," *IEEE Broadband Communications* (1998); Srinivasan, V. and G. Varghese, "Faster IP lookups using controlled prefix expansion," *ACM Transactions on Computer Systems*, 1-40(1999); Sahni, S. and Kim, K. "Efficient construction of fixed-stride multibit tries for IP lookup," *Proceedings 8$^{th}$ IEEE Workshop on Future Trends of Distributed Computing Systems* (2001); Sahni, S. and Kim, K. "Efficient construction of variable-stride multibit tries for IP lookup," *Proceedings IEEE Symposium on Applications and the Internet (SAINT)*, 220-227 (2002)). Some of the proposed structures perform dynamic router-table operations (lookup, insert; delete) in $O(W)$ time. Others attempt to optimize lookup time and memory requirement through an expensive preprocessing step. These structures, while providing very fast lookup capability, have a prohibitive insert/delete time and so, they are suitable only for static router-tables (i.e., tables into/from which no inserts and deletes take place).

Another proposed scheme performs a binary search on hash tables organized by prefix length (Waldvogel, M., "Scalable high speed IP routing lookups," *ACM SIGCOMM*, 25-36 (1997)). This binary-search scheme has an expected complexity of $O(\log W)$ for lookup. An alternative adaptation of binary search to longest-prefix matching uses a multi-way and multicolumn search (Lampson, B., et al., "IP lookup using multi-way and multicolumn search," *IEEE INFOCOM* (1998)). Using this adaptation, a lookup in a table that has n prefixes takes $O(W+\log n)=O(W)$ time. Because both schemes also use expensive precomputation, they are not suited for dynamic router-tables.

A B-tree data structure for dynamic router tables has been proposed (Suri, S. et al., "Multiway range trees: Scalable IP lookup with fast updates," *GLOBECOM* (2001). Using the B-tree data structure, the longest matching-prefix, lmp(d), can be found in $O(\log n)$ time. However, inserts/deletes take $O(W \log n)$ time. When W bits fit in $O(1)$ words (as is the case for IPv4 and IPv6 prefixes) logical operations on W-bit vectors can be done in $O(1)$ time each. In this case, the scheme takes $O(\log W \log n)$ time for an insert and $O(W+\log n)=O(W)$ time for a delete. The number of cache misses that occur when the data structure is used is $O(\log n)$ per operation.

Data structures have been developed called a collection of red-black trees (CRBT) and alternate collection of red-black trees (ACRBT) which support the three operations of a dynamic router-table (longest matching-prefix, prefix insert, and prefix delete) in $O(\log n)$ time each. (Sahni, S. and K.

Kim, "O(log n) dynamic packet routing," *IEEE Symposium on Computers and Communications* (2002)). The number of cache misses in each structure is also O(log n). Like the original biased-skip list structure of Ergun, F. et al. ("A dynamic lookup scheme for bursty access patterns," *IEEE INFOCOM* (2001)), CRBT and ACRBT adapt so as to perform lookups faster for bursty access patterns than for non-bursty patterns. The ACRBT structure may also be adapted to obtain a collection of splay trees structure, which performs the three dynamic router-table operations in O(log n) amortized time and which adapts to provide faster lookups for bursty traffic.

Priority search trees have also been used to arrive at an O(log n) data structure for dynamic prefix-tables. This structure is faster than the CRBT structure described above. A data structure that employs priority search trees and red-black trees for the representation of rule tables in which the filters are a conflict-free set of ranges has also been proposed. This data structure permits most-specific-range matching as well as range insertion and deletion to be done in O(log n) time each.

Data structures BOB (binary tree on binary tree) have also been developed for dynamic router-tables in which the rule filters are non-intersecting ranges and in which the ties are broken by selecting the highest-priority rule that matches a destination address. Using BOB, the highest-priority rule that matches a destination address may be found in $O(\log^2 n)$ time; a new rule may be inserted and an old one deleted in O(log n) time. Related structures PBOB (prefix BOB) and LMPBOB (longest matching-prefix BOB) have been proposed for highest-priority prefix matching and longest-matching prefixes. These structures apply when all filters are prefixes. The data structure LMPBOB permits longest-prefix matching in O(W) time; rule insertion and deletion take O(log n) time each. On practical rule tables, BOB and PBOB perform each of the three dynamic-table operations in O(log n) time and with O(log n) cache misses. The number of cache misses incurred by LMPBOB is also O(log n).

In addition to prefix routing, range routing can also be used. In a range router-table, each rule is a range of destination addresses. Several criteria have been proposed to select the best rule that matches a given destination address—first matching-rule in table, highest-priority rule that matches the address, and so on. For example, two data structures have been developed for dynamic range-router-tables—heap on TRIE (HOT) and binary search tree on TRIE (BOT) (see Gupta and McKeown, "Dynamic algorithms with worst-case performance for packet classification," *IFIP Networking* (2000)). Both of these data structures are for cases when the best-matching rule is the highest-priority rule that matches the given destination address. The HOT takes O(W) time for a lookup and O(W log n) time for an insert or delete. The BOT structure takes O(W log n) time for a lookup and O(W) time for an insert/delete. However it would be desirable to reduce these times as much as possible to efficiently route packets.

Hardware solutions that involve the use of content addressable memory as well as solutions that involve modifications to the Internet Protocol (i.e., the addition of information to each packet) have also been proposed to increase the efficiency of routing packets. Unfortunately, hardware solutions are expensive and are difficult to individualize to specific needs.

In addition to the above mentioned papers, a number of U.S. Patents and published applications address dynamic routing schemes including, but not limited to U.S. Pat. Nos. 6,341,130; 6,335,932; 6,289,013; 6,212,184; 6,157,955; 6,092,072; 6,061,712; 6,041,053; 6,021,131; 6,018,524; 5,909,440; 5,787,430; 5,701,467; 5,555,405; 4,833,468; 4,251,861; and published patent application number 2002/0009076. Unfortunately, these references do not disclose schemes that adequately reduce the time in routing packets.

Accordingly, there is a need in the art for a routing structure to provide more effective ways to classify and route data packets. Specifically, prefix and interval partitioning schemes are needed to provide rapid and more memory efficient methods to search, insert and delete items in known dynamic router data tables.

SUMMARY OF THE INVENTION

The present invention provides unique schemes that are simple and permit faster prefix routing in dynamic router tables. As contemplated by the present invention, a dynamic routing table is constructed in which prefixes are partitioned at each node into up to $\min(n, 2^s+1)$ partitions based on the value of the first s bits of the prefixes, wherein $s \leq W$. W is commonly used to denote the maximum possible length of a prefix. Prefixes having lengths less than s are placed into a designated partition (i.e., partition −1), with the remaining prefixes whose lengths are greater than or equal to s being stored in the partitions that correspond to the value of their first s bits.

The present invention also includes dynamic interval based structures with novel partitions. An interval is the range of destination addresses for each prefix, wherein two consecutive end points define a basic interval. According to the present invention, a data structure is constructed in which basic intervals are partitioned on the first s bits of the start point of each basic interval and are each stored in a node in a prefix tree (also called a prefix node). A "basic interval tree" or BIT is employed to determine in which basic interval any given destination address d is located. Along with each basic interval is a pointer to a node on a "back-end prefix tree," which contains each of the prefixes in the router table. For each partition of basic intervals, a separate data structure is constructed, whereas the back-end prefix trees are unaffected by the partitioning, thus increasing routing efficiency.

In accordance with the present invention, prefix or interval partitioning schemes are applied to interval-based data structures including, but not limited to, priority search trees, red-black trees (i.e., a collection of red-black trees: ACRBT), and a collection of red-black trees with each search tree being a splay tree (CST).

In a preferred embodiment, the partitioning schemes of the invention are applied to data structures in which basic intervals or partitioned prefixes are represented in a priority search tree and red-black priority search tree. In a related embodiment, router operations (i.e., matching, inserting and deleting of data) in a dynamic router table comprising address partitioned prefixes (by prefix partitioning or by interval partitioning) are accomplished by finding the longest matching prefix or interval using priority search trees alone or in combination with red black trees.

In view of the foregoing, it is an object of the present invention to provide an improved system and method for matching, inserting and deleting data in a dynamic router table.

The advantages of the invention are numerous. One significant advantage of the invention is that it provides a more memory efficient data structure, allowing better system resource allocation. Compared to conventional methods, the invention also reduces the time required to insert and delete tuples in a dynamic data table. Furthermore, by implementing the current invention in dynamic routers, network congestion can be reduced, throughput of network traffic can be increased, router table updates can be performed in real time, and the number of lost packets can be reduced.

Other aspects and advantages of the invention will become apparent from the following detailed description taken in conjunction with the accompanying drawings, illustrating, by way of example, the principles of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A, 2B, 2C, and 2D are histograms of partition sizes (excluding partition −1) for router tables in which OLDP is applied in accordance with the present invention.

FIGS. 6A and 6B illustrate an exemplary prefix set and its expansion when applied to fixed-stride tries in accordance with the present invention.

FIG. 7 illustrates a fixed-stride trie for the expanded prefixes of FIG. 10(b) in accordance with the present invention.

FIG. 14A illustrates a basic interval tree and FIGS. 14B through 14F illustrate the prefix trees for prefixes P1 through P5 of the example provided.

DETAILED DISCLOSURE OF THE INVENTION

The present invention relates to methods for improving router operations and improving the amount of memory storage required for current router table structures. In one embodiment of the present invention, the dynamic router table is organized such that prefixes are partitioned into up to $\min(n, 2^s+1)$ partitions by comparing the prefix length to a pre-established s, where $s \leq W$ (W generally refers to the length of a destination address). In another embodiment, the present invention represents prefixes as basic intervals and partitions the basic intervals in $2^s$-entry partitions by comparing the start point of each basic interval to a pre-established s.

The prefix and interval partitioning schemes of the invention are applicable to interval based router-table designs. In a preferred embodiment, the partitioning schemes of the invention are applied to a dynamic router table consisting of a PST and a red black priority search tree (RBPST).

I. Prefix Partitioning

The present invention relates to multi-level partitioning, in which a dynamic router table structure is organized such that prefixes are partitioned by the first s bits of the prefixes, where $s \leq W$. The partitioned tree comprises $2^s+1$ partitions. Prefixes that are of a length less than s bits fall into a designated partition (i.e., partition −1); the remaining prefixes are stored in partitions that correspond to their first s bit value. By storing shorter length prefixes in a designated partition, the prefix partitioning scheme of the present invention is suitable for dynamic routing operations.

Figure 1:
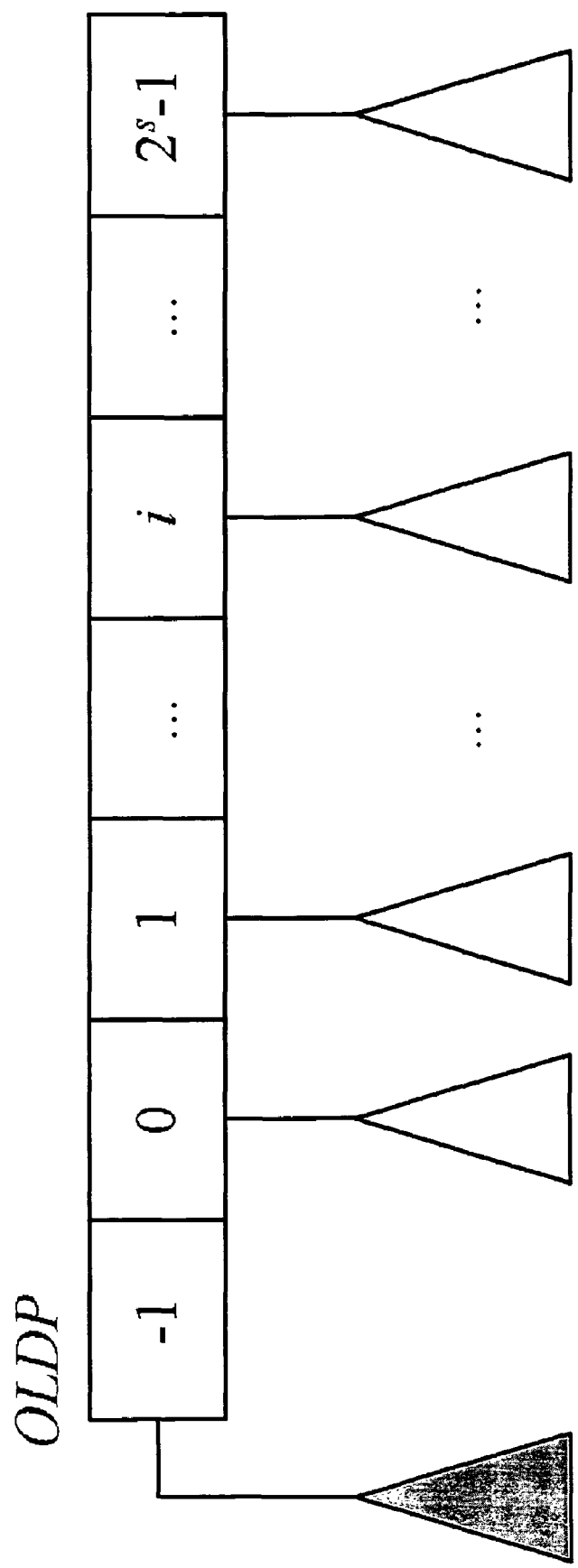
FIG. 1 is a pictorial representation of a one-level dynamic prefix partitioning scheme of the present invention.
Figure 2C:
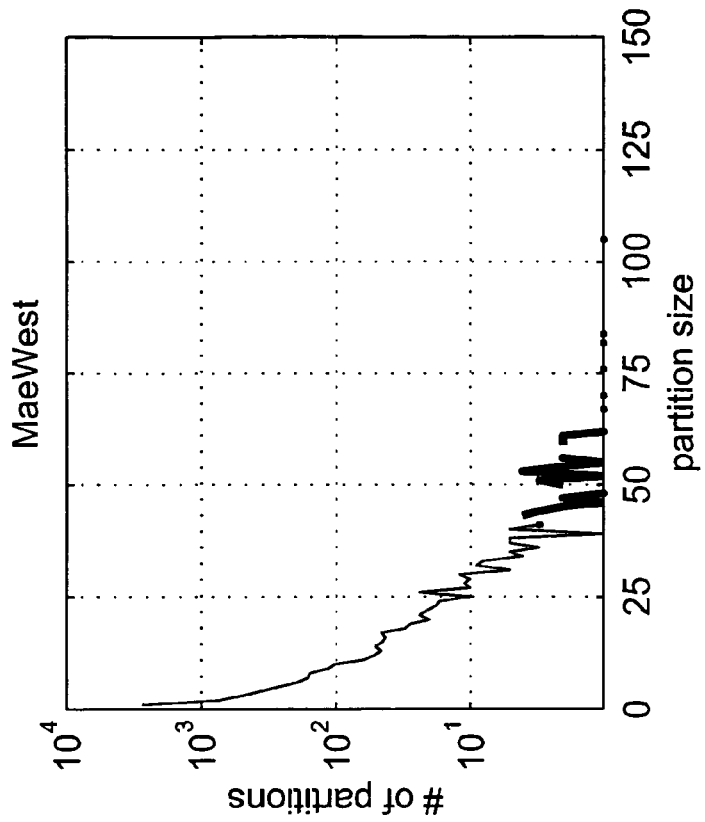
Figure 2D:
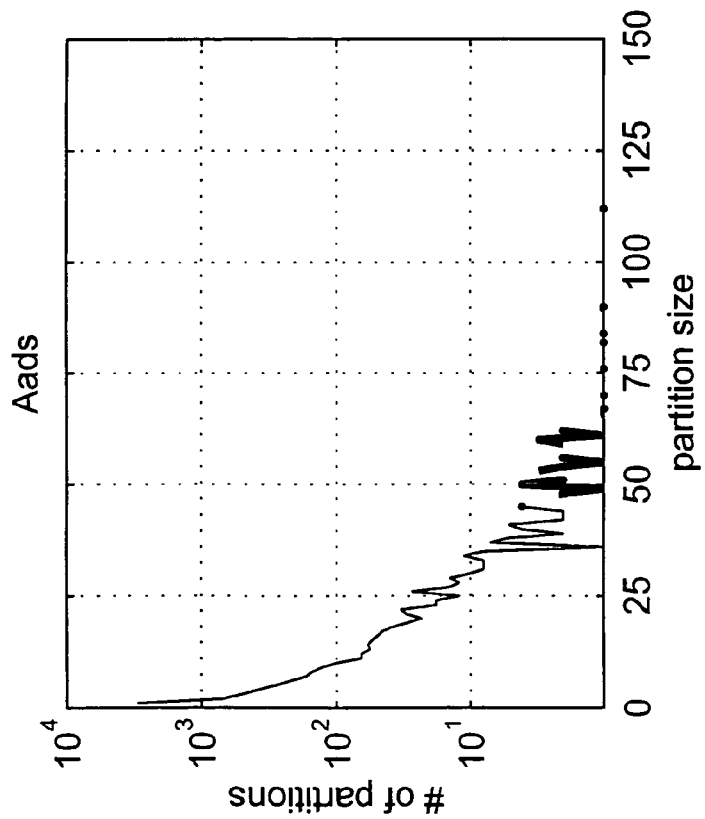

In one embodiment of the present invention, a one-level dynamic partition (OLDP) structure is provided in which the root node represents the partitioning of the router-table into $2^s+1$ partitions. As illustrated in FIG. 1, s bits are established so that incoming packets specifying prefixes and decisions rules for the prefixes can be partitioned. The prefix is assessed to determine whether the prefix has a length greater than or equal to s. Should the prefix have a length that is less than s, the prefix falls into a designated partition (i.e., partition −1). Prefixes whose lengths are equal to or greater than s are placed into a partition that corresponds to the value of their first s bit. The prefixes in each partition are then represented using dynamic router table data structures.

Compatible dynamic router table data structures include router table data structures that have been disclosed in Lampson et al., "IP lookup using multiway and multicolumn search," *IEEE INFOCOM,* 1998; Ergun et al., "A dynamic lookup scheme for bursty access patterns," *IEEE INFOCOM,* 2001; in U.S. Pat. Nos. 6,266,706; 6,563,823; 6,522,632; and 5,761,440.

The OLDP of the invention was applied to four different types of known router tables —Paix, Pb, Aads, MaeWest— with s=16. As can be seen in the following Table 1 and in FIGS. 2A, 2B, 2C, and 2D, OLDP with s=16 is quite effective in reducing both the maximum and the average partition size. In all of the representative databases, partition −1 was substantially larger than the remaining partitions.

TABLE 1

Statistics of one level partition (s = 16)

| Database | Paix | Pb | Aads | MaeWest |
|---|---|---|---|---|
| # of prefixes | 85988 | 35303 | 31828 | 28890 |
| # of nonempty partitions | 10443 | 6111 | 6363 | 6026 |
| Partition-1 | 586 | 187 | 188 | 268 |
| Max size of remaining partitions | 229 | 124 | 112 | 105 |

TABLE 1-continued

Statistics of one level partition (s = 16)

| Database | Paix | Pb | Aads | MaeWest |
|---|---|---|---|---|
| Average size of nonempty partitions (excluding partition-1) | 8.2 | 5.7 | 5.0 | 4.8 |

Figure 3:
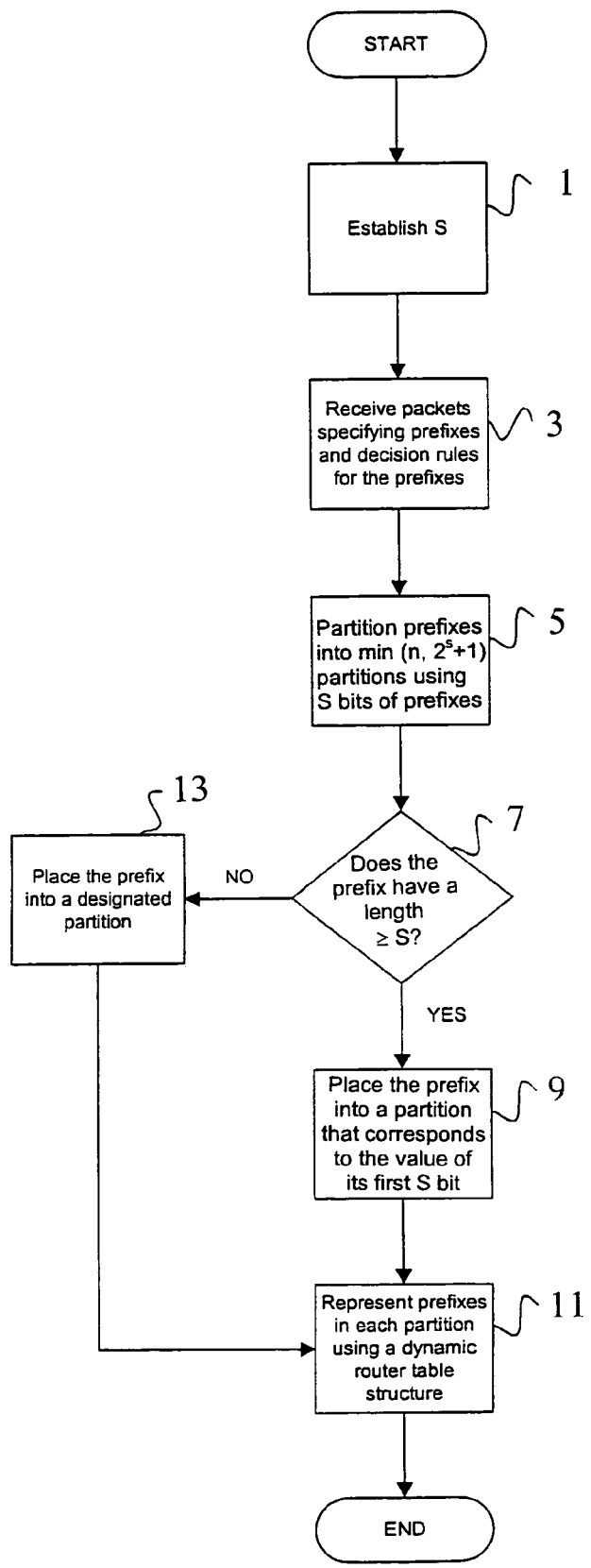
FIG. 3 is a flow chart illustrating the steps of using the prefix partitioning scheme of FIG. 1.

In a preferred embodiment, a dynamic router table is constructed in which OLDP is implemented to partition the prefixes in the table. The partitions can be represented using any known dynamic routing table data structure (i.e., hash tables). For example, as illustrated in FIG. 3, a dynamic router table using the multilevel prefix partitioning scheme of the present invention comprises the steps of: establishing the s bits with which the prefixes will be partitioned 1; receiving packets specifying the prefixes and decision rules for the prefixes 3; partitioning the prefixes into up to min(n, $2^s+1$) partitions based on the first s bits of the prefixes 5; identifying whether the prefixes have a length equal to or greater than s 7; and should the prefixes have a length equal to or greater than s, placing the prefixes into partitions that correspond to the value of their first s bit 9 and representing them in each partition using a dynamic router structure 11; or should the prefixes have a length less than s bits, they are placed into a designated partition (i.e., partition −1) 13.

Figure 4:
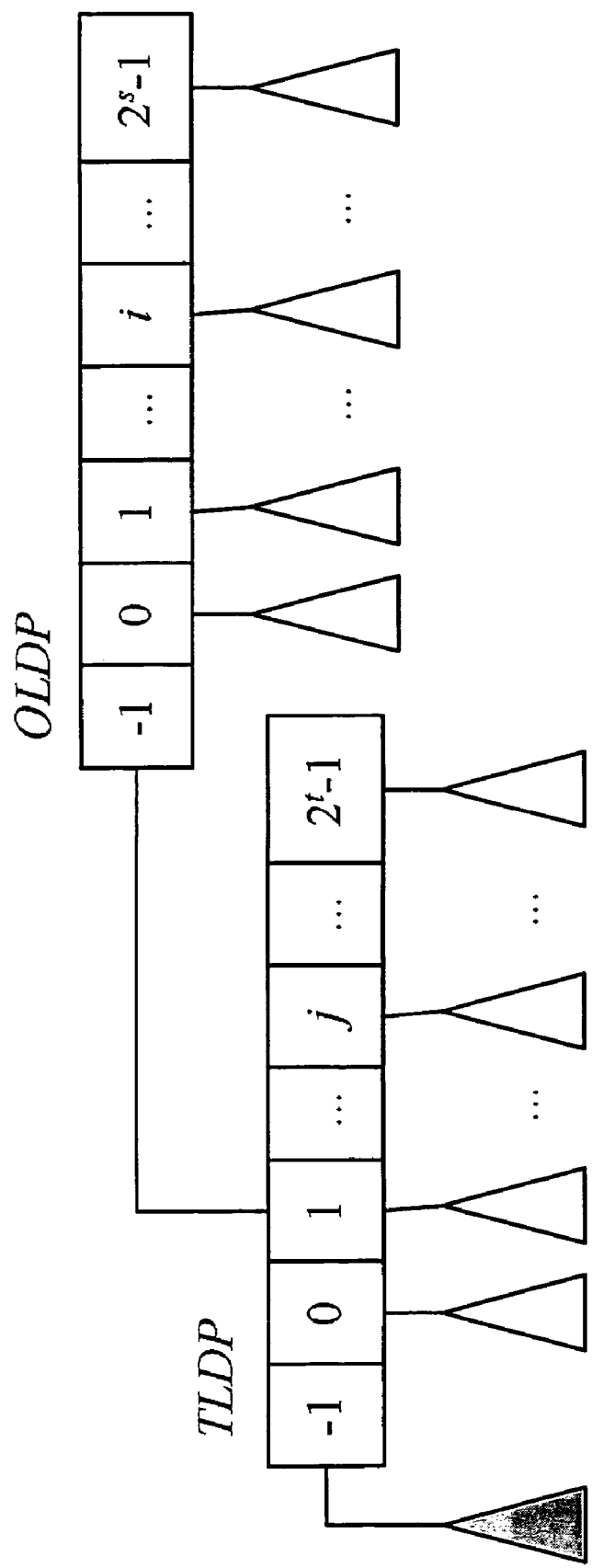
FIG. 4 is a pictorial representation of a two-level dynamic prefix partitioning scheme of the present invention.

In FIG. 4, a two level dynamic partition (TLDP) structure is constructed in which the root node partitions the prefix set into partitions of OLDP by using the first s bits of each prefix. Additionally, the set of prefixes in the designation partition for prefixes whose length is less than s (i.e., partition −1) is further partitioned at node TLDP by using pre-established t bits, wherein t<s bits of the prefixes in partition −1. This partitioning follows the strategy used at the root. However, t rather than s bits are used. The prefixes of the partitions can be represented using known routing table data structures (i.e., B-tree data structure, HOT and BOT data structures, CRBT and ACRBT data structures, PST data structure, CST, MUTIBIT, TRIE, and ARRAY).

Figure 5:
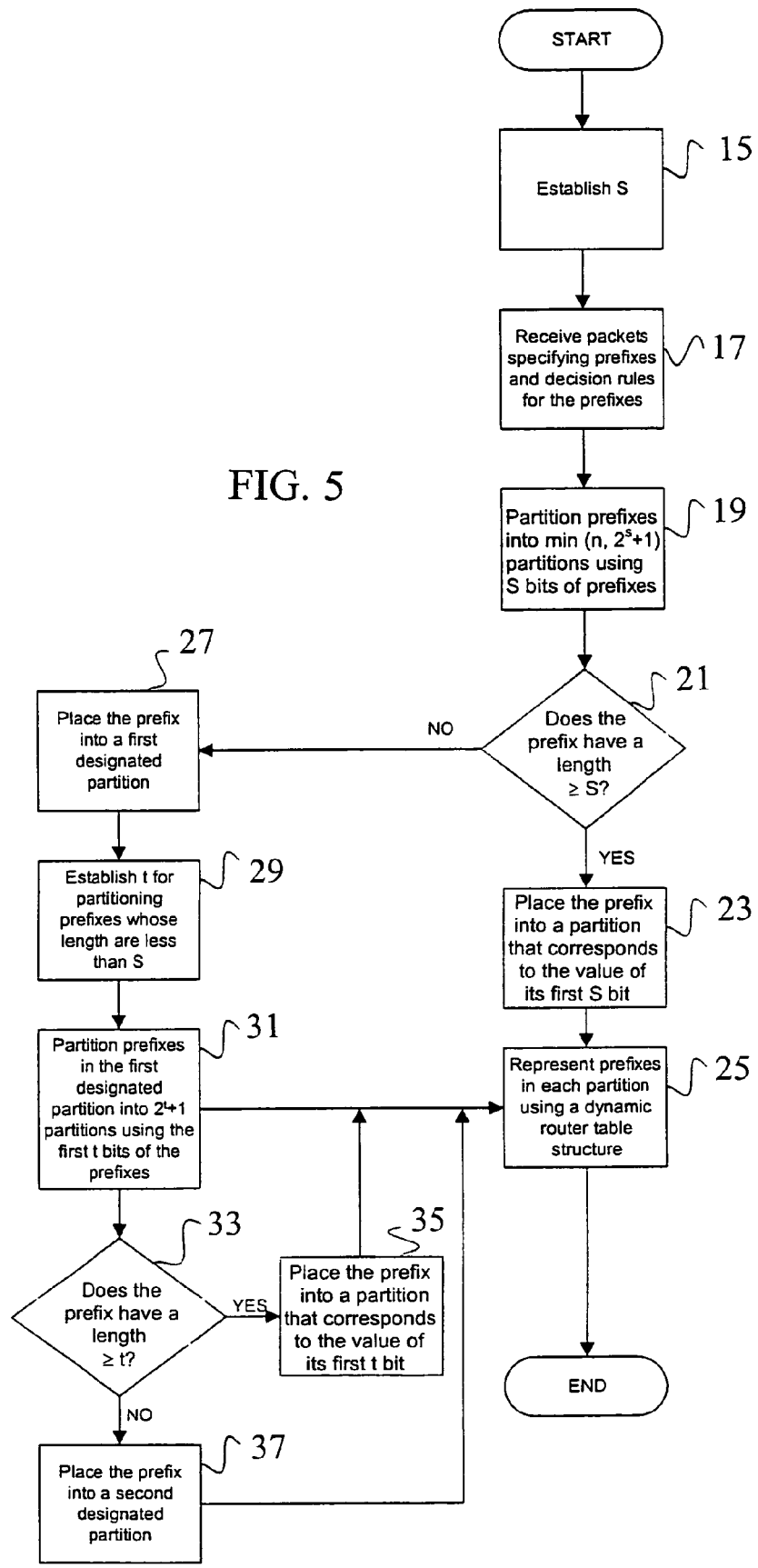
FIG. 5 is a flow chart illustrating the steps of using the prefix partitioning scheme of FIG. 4.

As illustrated in FIG. 5, a TLDP structure is constructed in a fashion very similar to that of OLDP. As with the OLDP, s bits by which prefixes are partitioned are first established 15 and packets specifying the prefixes and decision rules for the prefixes are received 17. The prefixes are then partitioned into min(n, $2^s+1$) partitions using the s bits of each prefix 19. Prefixes having a length equal to or greater than s bits are identified 21. Prefixes whose lengths are equal to or greater than s are placed into a partition that corresponds to the value of their first s bit 23. The prefixes in each partition are represented using a dynamic routing table structure 25.

Where the prefixes have a length less than s, they are placed into a first designated partition, partition −1 27. Then, t bits are established by which the prefixes are further partitioned 29. The prefixes in the first designated partition (partition −1) are further partitioned into $2^t+1$ partitions using the first t bits of the prefixes 31. Where a prefix in partition −1 has a length equal to or greater than t 33, the prefix is placed into a partition that corresponds to the value of its first t bit 35. A prefix whose length is less than t is placed into a second designated partition 37. Therefore, the prefixes of partition −1, are further partitioned into $2^t+1$ partitions using the first t bits of the prefixes.

The TLDP of the invention was applied to four different types of known router tables —Paix, Pb, Aads, MaeWest— with s=16 and t=8. When the number of prefixes in each partition is rather small, each partition can be represented using an array linear list in which the prefixes are in decreasing order of length. As can be seen in the following Table 2, TLDP with s=16 and t=8 is quite effective in reducing both the maximum and the average partition size.

TABLE 2

Statistics of two level partitions (s = 16 and t = 8)

| Database | Paix | Pb | Aads | MaeWest |
|---|---|---|---|---|
| OLDP Partition-1 | 586 | 187 | 188 | 268 |
| # of nonempty TLDP partition | 91 | 57 | 53 | 67 |
| TLDP Partition-1 | 0 | 0 | 0 | 0 |
| Max {TLDP partitions} | 33 | 12 | 15 | 15 |
| Average number of nonempty TLDP partitions | 6.4 | 3.3 | 3.5 | 4.0 |

Using the prefix partitioning scheme of the present invention, the prefixes in each partition in the router table can be represented using a dynamic router table structure known to the skilled artisan. By doing so, the processing time required to search, insert, and delete tuples in each partition is reduced.

In one embodiment, at least one partition is constructed using a priority search tree (PST). The priority search tree can perform router operations alone or in combination with other priority search trees. In a preferred embodiment, the priority search tree is a red black priority search tree (RBPST). In another embodiment, the priority search tree is a radix priority search tree.

Prefix partitions using a priority search tree can perform the functions of search, insert, and delete of tuples expeditiously. It is well known that if R is a set of ranges such that each range represents an address prefix, no two ranges will intersect. As a result, the set of ranges R, is conflict free. To find the most specific range in the partition, the ranges are represented in a PST. By operating on the PST to define a rectangle comprising the ranges associated with the desired destination address, the most specific range can then be found by locating the point in the defined rectangle having the least x-value. Using this method, the longest prefix is located in the dynamic router table. To insert a prefix into the router data table, the range is mapped and transformed as described above, and the transformed range is inserted into the PST. To delete a prefix, the transformed range is removed from the PST. When the PST is an RBPST, each search, insert, and delete action is performed in O(log n) time.

EXAMPLE 1

OLDP and TLDP Application to Fixed-Stride Tries

A trie node whose stride is s has $2^s$ subtries, some or all of which may be empty. A fixed-stride trie (FST) is a trie in which all nodes that are at the same level have the same stride. The nodes at level i of an FST store prefixes whose length, length(i), is $\Sigma_{j=0}^{i} s_j$, where $s_j$ is the stride for nodes at level j. In certain instances, the present invention provides for the expansion of a prefix with a nonpermissible length to the next permissible length. In such instances, where a newly created prefix is a duplicate, natural dominance rules are applied to eliminate all but one occurrence of the prefix. Because duplicate prefixes are eliminated from the expanded prefix set, all prefixes are distinct.

Figures 6B, 7:
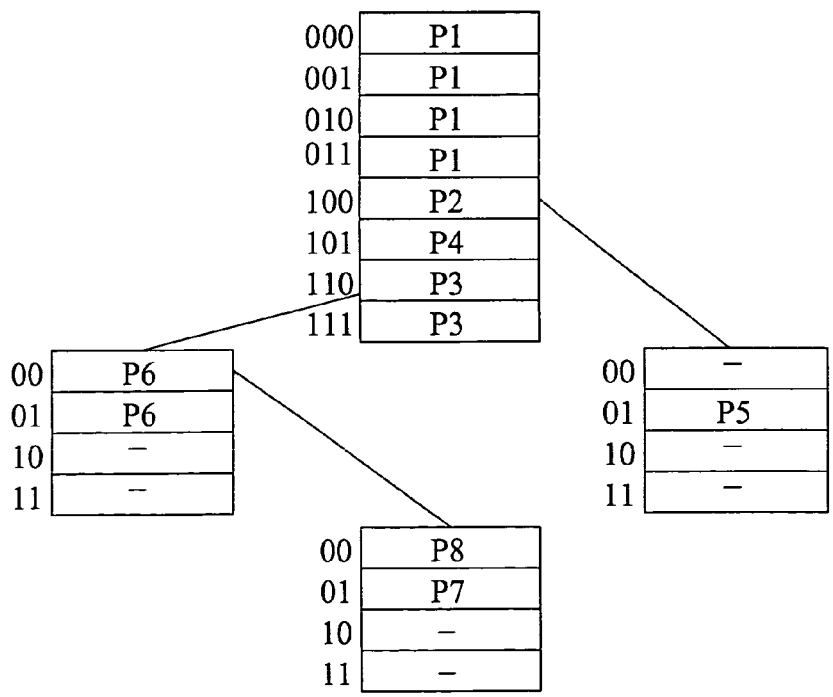

By way of example, a set of prefixes is represented on an FST that has three levels, wherein the strides are 3, 2, and 2. The root of the trie stores prefixes whose length is 3; the level one nodes store prefixes whose length is 5 (3+2); and the level two nodes store prefixes whose length is 7 (3+2+2). This poses a problem for prefixes in which the length is different from the storeable length. For instance, suppose the length of a prefix is 2. In accordance with the present invention, the length of the prefix can be expanded to the next permissible length. For example, as illustrated in FIG. 6A, P3=11* is expanded to P3a=110* and P3b=111*. If one of the newly created prefixes is a duplicate, natural dominance rules are used to eliminate all but one occurrence of the prefix. For instance, P7=110000* is expanded to P7a=1100000* and P7b=1100001*. However, P8=1100000* is to be chosen over P7a=1100000*, because P8 is a longer match than P7. So P7a is eliminated. Because the elimination of duplicate prefixes from the expanded prefix set, all prefixes are distinct. FIG. 6B shows the prefixes that result when the prefixes of FIG. 6A are expanded to lengths 3, 5, and 7. FIG. 7 illustrates the corresponding FST whose height is 2 and whose strides are 3, 2, and 2.

The FST of FIG. 7 can be searched with at most 3 memory references, thus demonstrating an improved time performance as compared to a 1-bit trie, which requires up to 7 memory references to perform a search for the prefix set of FIGS. 6A and 6B. For any given set of prefixes, the memory required by an FST of whose height is at most k depends on the strides of the up to k+1 levels in the FST. Algorithms have been developed to efficiently find the up to k+1 strides that result in most memory efficient FSTs. For dynamic router tables, however, the optimal strides change with each new insert or delete operation. Therefore, instead of maintaining optimality of strides dynamically, the strides must be fixed based on expected characteristics of the prefix set. The use of expected characteristics precludes the use of variable-stride tries.

To determine the strides of the FST for dynamic router tables, the distribution of prefixes in a database is examined. For example, the following Table 3 provides a distribution of the prefix set of FIGS. 6A and 6B in a Paix database. Fewer than 0.7% of the Paix prefixes have length<16.

TABLE 3

| | Distribution of prefixes in Paix | | |
| Len | # of Prefixes | % of prefixes | Cumulative % of prefixes |
| --- | --- | --- | --- |
| 1 | 0 | 0.0000 | 0.0000 |
| 2 | 0 | 0.0000 | 0.0000 |
| 3 | 0 | 0.0000 | 0.0000 |
| 4 | 0 | 0.0000 | 0.0000 |
| 5 | 0 | 0.0000 | 0.0000 |
| 6 | 0 | 0.0000 | 0.0000 |
| 7 | 0 | 0.0000 | 0.0000 |
| 8 | 22 | 0.0267 | 0.0257 |
| 9 | 4 | 0.0047 | 0.0303 |
| 10 | 5 | 0.0058 | 0.0362 |
| 11 | 9 | 0.0105 | 0.0467 |
| 12 | 26 | 0.0303 | 0.0770 |
| 13 | 56 | 0.0654 | 0.1424 |
| 14 | 176 | 0.2054 | 0.3478 |
| 15 | 288 | 0.3361 | 0.6839 |
| 16 | 6606 | 7.7099 | 8.3938 |
| 17 | 918 | 1.0714 | 9.4652 |
| 18 | 1787 | 2.0856 | 11.5509 |
| 19 | 5862 | 6.8416 | 18.3924 |
| 20 | 3614 | 4.2179 | 22.6103 |
| 21 | 3750 | 4.3766 | 26.9870 |
| 22 | 5525 | 6.4483 | 33.4353 |
| 23 | 7217 | 8.4230 | 41.8583 |
| 24 | 49756 | 58.0705 | 99.9288 |
| 25 | 12 | 0.0140 | 99.9428 |
| 26 | 26 | 0.0303 | 99.9732 |
| 27 | 12 | 0.0140 | 99.9872 |
| 28 | 5 | 0.0058 | 99.9930 |
| 29 | 4 | 0.0047 | 99.9977 |
| 30 | 1 | 0.0012 | 99.9988 |
| 31 | 0 | 0.0000 | 99.9988 |
| 32 | 1 | 0.0012 | 100.0000 |

Hence, using a root stride of 16 will require only a small percentage of the prefixes from length<16 to be expanded to length 16. Because using a larger stride for the root required the expansion of the 6606 prefixes of length 16, the root stride was set at 16. For the children and grandchildren of the root, a stride of 4 was chosen. Thus, the prefixes whose length is 17, 18, and 19 were expanded to length 20 and prefixes whose length is 21, 22, and 23 were expanded to length 24. The level 4 nodes were given a stride of 8, requiring the expansion of those prefixes whose length is between 25 and 31 to the length of 32. These stride choices result in a 16-4-4-8-FST (root stride is 16, level 1 and level 2 stride are 4, level 3 stride is 8). Since a 16-4-4-8 FST has 4 levels, the longest matching prefix may be found with at most 4 memory accesses. In other embodiments, a 16-8-8-FST or a 16-4-4-4-4-FST are used in accordance with the present invention.

To find the longest matching prefix using an FST containing the prefix partitioning scheme of the present invention, the bits of d are used to follow a path from the root of the FST toward a leaf. The last prefix encountered along this path is the longest matching prefix. For example, to determine the longest matching prefix for 1100010 from the 3-2-2-FST of FIG. 6B, the first three bits (110) are used to obtain the left level 1 node, as illustrated in FIG. 7. The next two bits (00) are used to reach the level 2 node. The final remaining last 2 bits (10) fall off the trie. The prefixes encountered on this path are P3(in the root) and P6(in the level 1 node; node that no prefix is encountered in the 10 fields of the level 2 node). The last prefix encountered is P6. Hence the longest matching prefix for 1100010 is P6.

To insert the prefix p, a search path determined by the bits of p is followed until the level i node N with property length (i−1)<length(p)≦length(i) (i.e., assume that length (−1)=0, is reached). Where a node N is not in the trie, empty nodes are added to the trie. The prefix p is then expanded to length length(i) and stored in the node slots for each of the expanded prefixes. Where a slot is already occupied, p is stored in the occupied spot only if it is longer than the prefix occupying the node.

To facilitate the delete operation, each node M of an FST maintains an auxiliary Boolean array M.prefixes[0:$2^s$−1[, where s is the stride of M. This array keeps track of the prefixes inserted at node M. When prefix p is inserted, N.prefixes[q] is set to true. q is $2^{length(p)-length(i-1)}$+number(i,p)−2, where (i,p) is a number represented by bits length(i−1) . . . length(p)−1 of p (the bits of p are indexed from left to right beginning with the index 0). For example, the bit-sequence 010 represents the number 2. An alternative to the array M.prefixes[ ] is to keep tack of the prefixes inserted at node M using a trie on bits length(i−1) . . . of the inserted prefixes.

To delete the prefix p, the node N is identified in the same fashion as that for an insertion operation described above. N.prefixes[q] is set to false, where q is computed as described above. To update the prefix slots of N that contain p, the longest proper prefix of p that is in N.prefixes is identified. This longest proper prefix is determined by examining N.prefixes[j] for $j=2^{r-length(i-1)}+$number $(i,p_r)-2$, $r=length(p)-1$, $length(p)-2, \ldots, length(i-1)+1$, where $p_r$ is the first r bits of p. The examination stops at the first j for which N.prefixes[j] is true. The corresponding prefix replaced p in the prefix slots of N. If there is no such j, the null prefix replaces p.

Since the root stride is 16, for the recommended IPv4 FSTs (16-4-4-8, 16-4-4-4-4, and 16-8-8) and since s=16 is recommended for IPv4, by way of example, an OLDP 16-4-4-4-4 FST has the structure shown in FIG. 1 with each OLDP[i], $i \geq 0$ being a 4-4-4-4 FST; OLDP[-1] is a 4-4-4-3 FST. The root of each 4-4-4-4 FST, while having a stride of 4, needs to account for prefixes of length 16 through 20.

In contrast, a TLDP 16-4-4-4-4 FST has the structure of FIG. 4 with each OLDP[i], $i \geq 0$ being a 4-4-4-4 FST; each TLDP[i], $i \geq 0$ is a 4-3-FST; and TLDP[-1] is a 4-3-FST. The root of each TLDP[i] 4-3-FST, while having a stride of 4, needs to account for prefixes of length 8 through 12.

II. Interval Partitioning According to the present invention, interval partitioning requires prefixes be represented as a range. The end points of the ranges are then ordered, wherein two consecutive endpoints define an interval (also called a "basic interval"). Using interval-based routing table data structures, the interval partitioning scheme of the present invention improves the performance of routing operations such as lookup, insertion, and deletion of prefixes while enabling memory efficiency.

Figure 8:
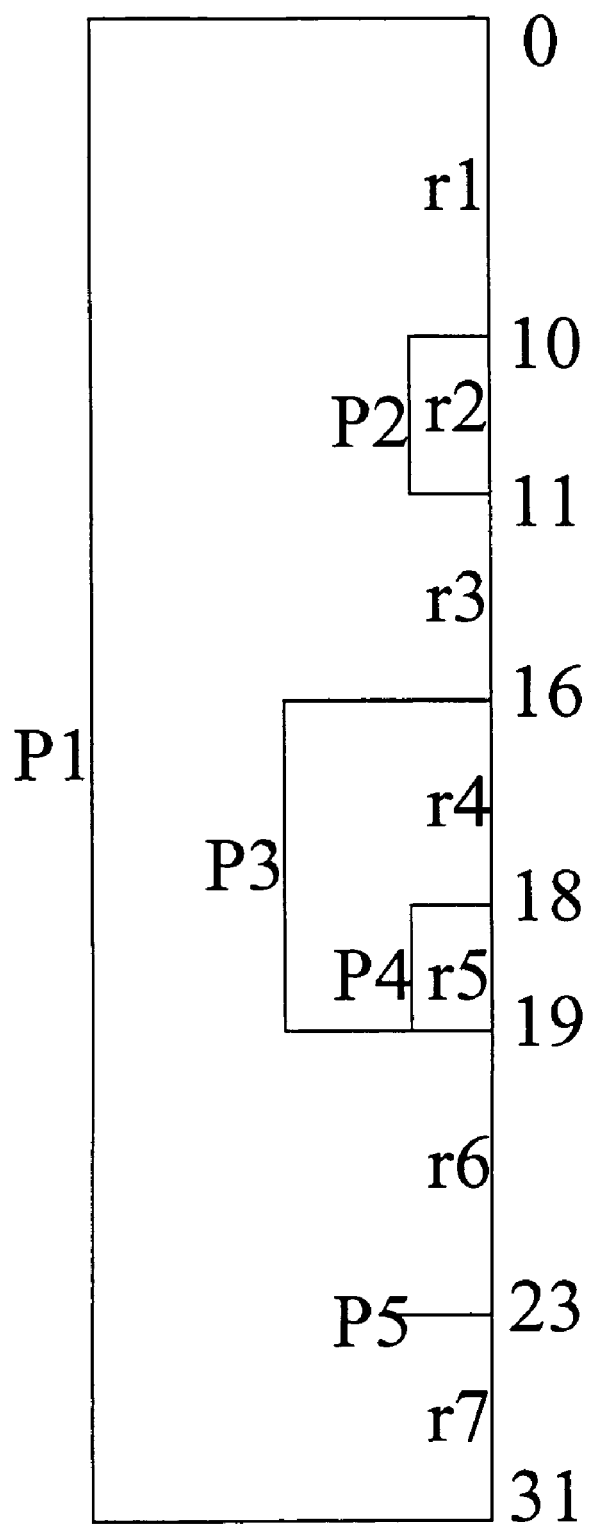
FIG. 8 is a pictorial representation of prefixes, ranges, and corresponding intervals in accordance with the present invention.

The present invention can be understood by means of an example. The following Table 4 is a set of five prefixes along with the range of destination addresses matched by each prefix. An illustration of basic intervals of the five prefixes of Table 4 is given in FIG. 8.

TABLE 4

Prefixes and their ranges, W = 5

| Prefix Name | Prefix | Range Start | Range Finish |
|---|---|---|---|
| P1 | * | 0 | 31 |
| P2 | 0101* | 10 | 11 |
| P3 | 100* | 16 | 19 |
| P4 | 1001* | 18 | 19 |
| P5 | 10111 | 23 | 23 |

In accordance with the invention, two consecutive end points define a basic interval. In general, n prefixes may have up to 2n distinct end points and 2n−1 basic intervals. As seen in Table 4, the end points of the five prefixes of Table 4 are, in ascending order, 0, 10, 11, 16, 18, 19, 23, and 31. Therefore, the basic intervals defined by the example of Table 4 are r1=[0,10], r2=[10,11], r3=[11,16], r4=16,18], r5=[18,19], r6=[19,23], and r7=[23,31].

In accordance with the invention, for each prefix and basic interval, x, next(x) is defined to be the smallest range prefix (i.e., the longest prefix) whose range includes the range of x. For the example of FIG. 8, the next( ) values for the basic intervals of r1 through r7 are, respectively, P1, P2, P1, P3, P4, P1, and P1.

Any known interval-based dynamic router table may be employed to determine the basic interval into which any destination address d is allocated. For example, a front-end basic-interval tree (BIT) can be used to perform such a function. See Sahni, S. and Kim, K., "O(logn) dynamic packet routing," *IEEE Symposium on Computers and Communications,* 2002. In one embodiment, prefix trees are constructed for each of the prefixes in the router table, hereinafter termed the back-end prefix trees or CPT.

III. Experimental Results for Prefix- and Interval-Partitioning Schemes of the Invention To assess the efficacy of the prefix partitioning schemes of the present invention, these schemes were programmed in C++ and applied as the OLDP[i], $i \geq 0$ structure (as well as the OLDP[-1] structure in the case of one-level dynamic partitioning) to the following dynamic router-table structures: (a) ACRBT (ACBST with each search tree being a red-black tree); (b) CST (ACBST with each search tree being a splay tree); (c) MULTIBIT (16-4-4-4-4 FST; in OLDP applications, 4-4-4-4-FSTs are used for OLDP[i], $i \geq 0$ and a 4-4-4-3-FST is used for OLDP[-1]; in TLDP applications, 4-4-4-4-FSTs are used for OLDP[i], $i \geq 0$, 4-3-FSTs for TLDP[i], $i \geq 0$, and a 4-3-FST for TLDP[-1]); (d) MULTIBITb (16-8-8 FST; in OLDP applications, 8-8-FSTs are used for OLDP[i], $i \geq 0$, and an 8-7-FST is used for OLDP[-1]; in TLDP applications, 8-8 FSTs are used for OLDP[i], $I \geq 0$ 8-FSTs for TLPD[i], $i \geq 0$, and a 7-FST is used for TLDP[-1]); (e) PST (prefix search trees); (f) PBOB (prefix binary tree on binary tree structure); (g) TRIE (one bit trie); and (h) ARRAY (this is an array linear list in which the prefixes are stored in a one-dimensional array in non-decreasing order of prefix length; the longest matching-prefix is determined by examining the prefixes in the order in which they are stored in the one-dimensional array; array doubling is used to increase array size, as necessary, during an insertion).

The notation ACRBT1p (ACRBT1 pure) was used, for example, to refer to OLDP with ACRBTs. ACRBT2p refers to TLDP with ACRBTs. ACRBTIP refers to interval partitioning applied to ACRBTs and CSTIP refers to interval partitioning applied to CSTs.

The schemes whose name end with an "a" (for example, ACRBT2a) are variants of the corresponding pure schemes. In ACRBT2a, for example, each of the TLDP codes, TLDP[i] was implemented as an array linear list until |TLDP[i]|>τ, where the threshold τ was set to 8. When |TLDP[i]|>τ for the first time, TLDP[i] was transformed from an array linear list to the target dynamic router-table structure (i.e., PBOB in the case of PBOB2). Once a TLDP[i] was transformed into the target dynamic router-table structure, there was no transformation back to the array linear list structure. Similarly, OLDP [i], $i \geq 0$ for TLDPs were implemented as array linear lists until |OLDP[i]|>τ for the first time. A similar use of array linear lists was made when implementing the OLDP codes.

When τ=0, the corresponding pure scheme (i.e., when τ=0, ACRBT1a is equivalent to ACRBT1p and PBOB2a is equivalent to PBOB2p, for example) is obtained and when τ=∞, one of the two partitioned ARRAY schemes (i.e., ACRBT1a, CST1a, PST1a, PBOB1a, etc. are equivalent to ARRAY1p while ACRBT2a, CST2a, MULTIBIT2a, etc. are equivalent to ARRAY2p) is obtained. By varying the threshold τ between the two extremes 0 and ∞, the performance of hybrid schemes such as ACRBT1a, MULTIBIT2a, etc. can be varied between that of the pure partitioned scheme and that of ARRAY1p and ARRAY2p.

ACRBT2aH refers to ACRBT2a in which the root-level partitioning node is represented using a hash table rather than an array. For the OLDP partitioning schemes, s=16 and t=∞. The combinations ARRAY1a and ARRAY2a are the same as ARRAY1p and ARRAY2p; thus, ARRAY1p and ARRAY2p are represented as ARRAY1a and ARRAY2a in the following tables and figures.

The codes for the partitioning schemes were run on a 2.26 GHz Pentium 4 PC that has 500 MB of memory. The Microsoft Visual C++6.0 compiler with optimization level −O2 was used. For test data, the four IPv4 prefix databases of Table 5 were used.

Total Memory Requirement

Figure 9:
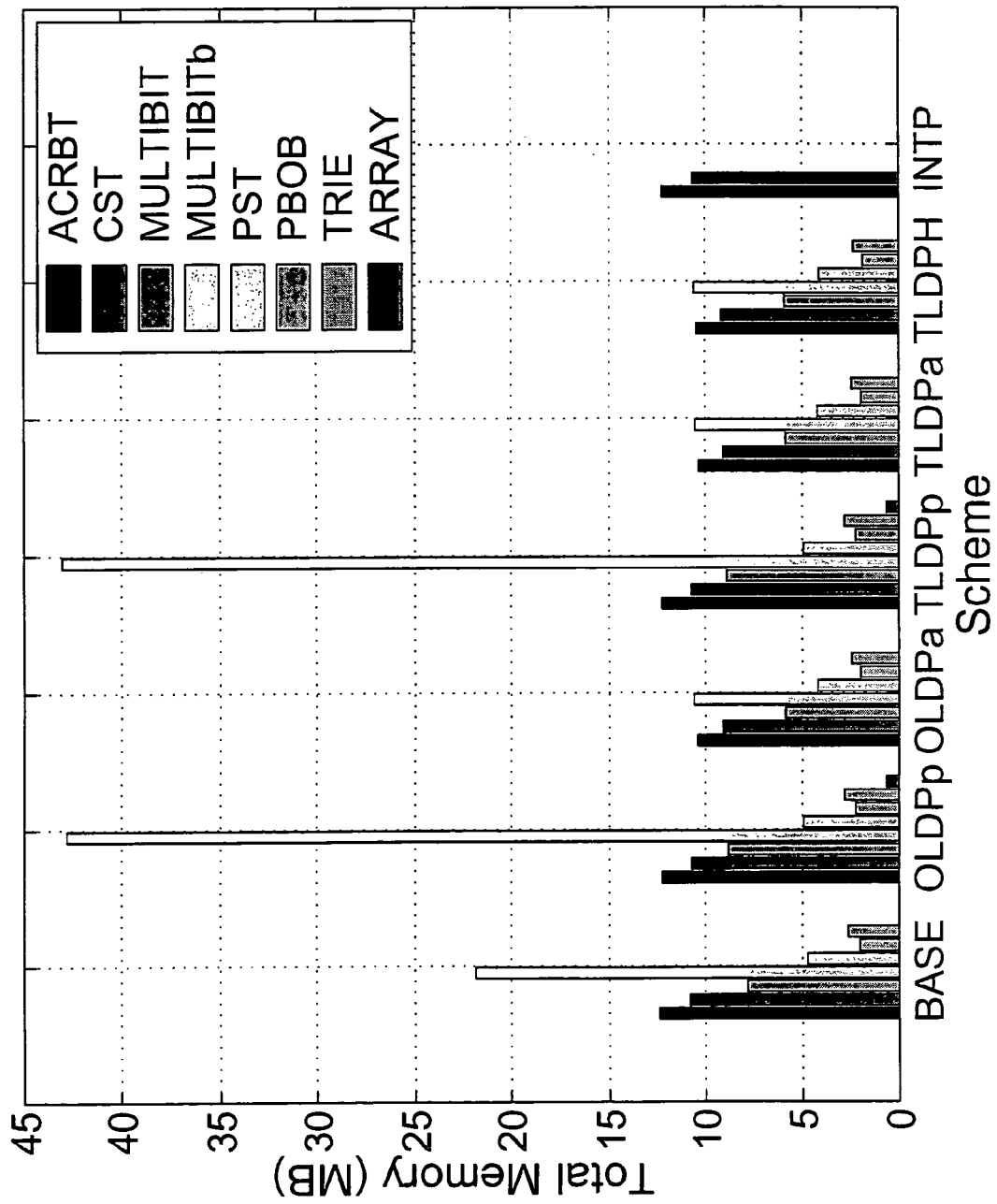
FIG. 9 is a graph illustrating the total memory required by each of the router-table data structures.

The following Tables 5 and 6 and FIG. 9 show the amount of memory used by each of the tested structures. In the figure, OLDPp refers to the pure one-level dynamic prefix partitioning versions of the base schemes and INTP refers to the interval partitioning versions, in accordance with the present invention. The amount of memory required by a base data structure (such as ACRBT) is generally less than that required by its OLDP version (ACRBT1p and ACRBT1a) and by its interval partitioning version (where applicable). ACRBT1a, ACRBT1p, CST1p, ACRBTIP, and CSTIP with Paix are some of the exceptions.

In the case of MaeWest, for example, the memory required by PBOB1p is about 39% more than that required by PBOB. The TLDP structures (both with an array for the OLDP node and with a hash table for this node) took considerably less memory than did the corresponding base structure. For example, MULTIBIT2a with MaeWest required only 45% of the memory taken by MULTIBIT and MULTIBITb2a with MaeWest took 23% of the memory taken by MULTIBITb.

The partitioning schemes of the present invention reduce run time and memory requirement. The TLDPa schemes were particularly effective in reducing memory requirement. Of the tested structures, ARRAY1p and ARRAY2p are the most memory efficient. The focus of the study was directed to the best from among the structures that guarantee a good worst-case performance. Of these latter structures, PBOB is the most memory efficient. On the Paix database, for example, PBOB1a takes only 19% of the memory taken by ACRBT1a and only 79% of the memory taken by TRIE1a; PBOB takes 16% of the memory taken by ACRBT and 75% of the memory taken by TRIE.

TABLE 5

Memory requirement (in KB)

| Scheme | Paix | Pb | Aads | MaeWest |
|---|---|---|---|---|
| ACRBT | 12360 | 5102 | 4587 | 4150 |
| CST | 10800 | 4457 | 4008 | 3636 |
| MULTIBIT | 7830 | 4939 | 4982 | 4685 |
| MULTIBITb | 21778 | 16729 | 19177 | 17953 |
| PST | 4702 | 1930 | 1740 | 1579 |
| PBOB | 1961 | 811 | 729 | 661 |
| TRIE | 2622 | 1091 | 980 | 890 |
| ACRBT1p | 12211 | 5479 | 5023 | 4638 |
| CST1p | 10708 | 4846 | 4451 | 4115 |
| MULTIBIT1p | 8848 | 5087 | 5098 | 4731 |
| MULTIBITb1p | 42845 | 25368 | 27278 | 24920 |
| PST1p | 4958 | 2186 | 1996 | 1835 |
| PBOB1p | 2219 | 1067 | 985 | 917 |
| TRIE1p | 2799 | 1279 | 1163 | 1075 |
| ARRAY1p | 632 | 417 | 405 | 392 |
| ACRBT1a | 10361 | 3736 | 3151 | 2787 |
| CST1a | 9079 | 3306 | 2799 | 2481 |
| MULTIBIT1a | 5884 | 2644 | 2439 | 2119 |
| MULTIBITb1a | 10605 | 4862 | 5588 | 4183 |
| PST1a | 4209 | 1603 | 1377 | 1237 |
| PBOB1a | 1928 | 851 | 757 | 697 |
| TRIE1a | 2457 | 1021 | 893 | 815 |
| ACRBT2p | 12212 | 5482 | 5027 | 4641 |
| CST2p | 10711 | 4849 | 4455 | 4119 |
| MULTIBIT2p | 8891 | 5104 | 5113 | 4752 |
| MULTIBITb2p | 43068 | 25503 | 27391 | 25065 |
| PST2p | 4959 | 2187 | 1997 | 1836 |
| PBOB2p | 2220 | 1068 | 986 | 918 |
| TRIE2p | 2799 | 1279 | 1163 | 1075 |
| ARRAY2p | 634 | 418 | 406 | 393 |

TABLE 5-continued

Memory requirement (in KB)

| Scheme | Paix | Pb | Aads | MaeWest |
|---|---|---|---|---|
| ACRBT2a | 10337 | 3720 | 3137 | 2767 |
| CST2a | 9060 | 3292 | 2786 | 2463 |
| MULTIBIT2a | 5858 | 2621 | 2414 | 2088 |
| MULTIBITb2a | 10514 | 4778 | 5498 | 4075 |
| PST2a | 4201 | 1597 | 1372 | 1229 |
| PBOB2a | 1926 | 850 | 755 | 695 |
| TRIE2a | 2452 | 1018 | 890 | 811 |
| ACRBTIP | 12218 | 5344 | 4856 | 4453 |
| CSTIP | 10658 | 4699 | 4277 | 3928 |

TABLE 6

Memory Requirement (in KB) (hash schemes)

| Scheme | Paix | Pb | Aads | MaeWest |
|---|---|---|---|---|
| ACRBT2aH | 10407 | 3656 | 3080 | 2699 |
| CST2aH | 9130 | 3228 | 2730 | 2397 |
| MULTIBIT2aH | 5928 | 2557 | 2359 | 2022 |
| MULTIBITb2aH | 10584 | 4714 | 5443 | 4009 |
| PST2aH | 4101 | 1498 | 1272 | 1129 |
| PBOB2aH | 1826 | 750 | 656 | 595 |
| TRIE2aH | 2353 | 919 | 790 | 711 |

Search Time

To measure the average search time, a data structure for each of the prefix databases were constructed. Four sets of test data were used. The destination addresses in the first set, NONTRACE, comprised the end points of the prefixes corresponding to the database being searched. These end points were randomly permuted. The data set, PSEUDOTRACE, was constructed from NONTRACE by selecting 1000 destination addresses.

A PSEUDOTRACE sequence comprises 1,000,000 search requests. For each search, a destination from the selected 1000 destination addresses was randomly chosen. The data set PSEUDOTRACE100 is similar to PSEUDOTRACE except that only 100 destination addresses were chosen to make up the 1,000,000 search requests. The last data set, PSEUDOTRACE100L16 differs from PSEUDOTRACE100 only in that the 100 destination addresses were chosen so that the length of the longest matching prefix for each is less than 16.

Every search in PSEUDOTRACE100L16 differs from PSEUDOTRACE100 only in that the 100 destination addresses were chosen so that the length of the longest matching prefix for each is less than 16. Therefore, every search in PSEUDOTRACE100L16 required a search in OLDP[−1]. The NONTRACE, PSEUDOTRACE, and PSEUDOTRACE100 data sets represent different degrees of burstiness in the search pattern. In NONTRACE, all search addresses are different. Thus, this access pattern represents the lowest possible degree of burstiness. In PSEUDOTRACE, since destination addresses that repeat are not necessarily in consecutive packets, there is some measure of temporal spread among the recurring addresses. PSEUDOTRACE100 has greater burstiness than does PSEUDOTRACE.

For the NONTRACE, PSEUDOTRACE, PSEUDOTRACE100, and PSEUDOTRACE100L16 data sets, the total search time for each data set was measured and then averaged to get the time for a single search. This experiment was repeated 10 times and 10 average times were obtained. The average of these averages is given in Tables 7 through 12. For the PSEUDOTRACE100 and PSEUDOTRACE100L16 data sets, the times are presented only for the base and pure one-level and two-level partitioning schemes. FIGS. 10A through 10D are histograms of the average time for PAIX.

TABLE 7

Average search time (in μsec) for NONTRACE

| Scheme | Paix | Pb | Aads | MaeWest |
|---|---|---|---|---|
| ACRBT | 1.31 | 0.98 | 0.94 | 0.92 |
| CST | 2.18 | 1.65 | 1.57 | 1.54 |
| MULTIBIT | 0.50 | 0.42 | 0.42 | 0.41 |
| MULTIBITb | 0.28 | 0.24 | 0.26 | 0.25 |
| PST | 1.09 | 0.80 | 0.75 | 0.70 |
| PBOB | 0.82 | 0.48 | 0.45 | 0.38 |
| TRIE | 1.12 | 0.82 | 0.75 | 0.68 |
| ACRBT1p | 1.13 | 0.90 | 0.87 | 0.85 |
| CST1p | 1.83 | 1.42 | 1.35 | 1.31 |
| MULTIBIT1p | 0.61 | 0.50 | 0.51 | 0.51 |
| MULTIBITb1p | 0.41 | 0.35 | 0.39 | 0.38 |
| PST1p | 0.76 | 0.59 | 0.55 | 0.51 |
| PBOB1p | 0.59 | 0.42 | 0.39 | 0.35 |
| TRIE1p | 0.80 | 0.60 | 0.56 | 0.51 |
| ARRAY1p | 0.19 | 0.10 | 0.10 | 0.09 |
| ACRBT1a | 0.97 | 0.66 | 0.60 | 0.57 |
| CST1a | 1.63 | 1.04 | 0.91 | 0.85 |
| MULTIBIT1a | 0.54 | 0.36 | 0.34 | 0.32 |
| MULTIBITb1a | 0.32 | 0.20 | 0.22 | 0.20 |
| PST1a | 0.70 | 0.45 | 0.39 | 0.34 |
| PBOB1a | 0.52 | 0.30 | 0.25 | 0.20 |
| TRIE1a | 0.69 | 0.41 | 0.36 | 0.31 |
| ACRBT2p | 1.13 | 0.89 | 0.87 | 0.86 |
| CST2p | 1.82 | 1.41 | 1.33 | 1.30 |
| MULTIBIT2p | 0.61 | 0.50 | 0.52 | 0.51 |
| MULTIBITb2p | 0.41 | 0.35 | 0.38 | 0.37 |
| PST2p | 0.76 | 0.59 | 0.55 | 0.50 |
| PBOB2p | 0.58 | 0.41 | 0.39 | 0.34 |
| TRIE2p | 0.79 | 0.60 | 0.56 | 0.50 |
| ARRAY2p | 0.19 | 0.11 | 0.10 | 0.09 |
| ACRBT2a | 0.97 | 0.66 | 0.60 | 0.57 |
| CST2a | 1.63 | 1.04 | 0.90 | 0.85 |
| MULTIBIT2a | 0.50 | 0.33 | 0.32 | 0.30 |
| MULTIBITb2a | 0.32 | 0.21 | 0.22 | 0.20 |
| PST2a | 0.70 | 0.45 | 0.39 | 0.34 |
| PBOB2a | 0.52 | 0.29 | 0.25 | 0.21 |
| TRIE2a | 0.68 | 0.41 | 0.35 | 0.30 |
| ACRBTIP | 0.87 | 0.67 | 0.62 | 0.61 |
| CSTIP | 1.42 | 1.05 | 0.96 | 0.93 |

TABLE 8

Average search time (in μsec) (hash schemes) for NONTRACE

| Scheme | Paix | Pb | Aads | MaeWest |
|---|---|---|---|---|
| ACRBT2aH | 1.10 | 0.75 | 0.69 | 0.65 |
| CST2aH | 1.75 | 1.13 | 0.99 | 0.93 |
| MULTIBIT2aH | 0.63 | 0.43 | 0.42 | 0.39 |
| MULTIBITb2aH | 0.39 | 0.27 | 0.28 | 0.26 |
| PST2aH | 0.83 | 0.57 | 0.48 | 0.41 |
| PBOB2aH | 0.68 | 0.41 | 0.33 | 0.27 |
| TRIE2aH | 0.79 | 0.55 | 0.45 | 0.38 |

TABLE 9

Average search time (in μsec) for PSUEDOTRACE

| Scheme | Paix | Pb | Aads | MaeWest |
|---|---|---|---|---|
| ACRBT | 1.18 | 0.85 | 0.83 | 0.81 |
| CST | 0.46 | 0.42 | 0.42 | 0.41 |
| MULTIBIT | 0.27 | 0.24 | 0.23 | 0.22 |
| MULTIBITb | 0.10 | 0.09 | 0.10 | 0.09 |

TABLE 9-continued

Average search time (in μsec) for PSUEDOTRACE

| Scheme | Paix | Pb | Aads | MaeWest |
|---|---|---|---|---|
| PST | 0.83 | 0.60 | 0.55 | 0.50 |
| PBOB | 0.59 | 0.34 | 0.34 | 0.29 |
| TRIE | 0.85 | 0.63 | 0.56 | 0.50 |
| ACRBT1p | 1.02 | 0.79 | 0.75 | 0.74 |
| CST1p | 0.47 | 0.40 | 0.41 | 0.41 |
| MULTIBIT1p | 0.36 | 0.29 | 0.34 | 0.31 |
| MULTIBITb1p | 0.20 | 0.17 | 0.18 | 0.19 |
| PST1p | 0.46 | 0.33 | 0.28 | 0.28 |
| PBOB1p | 0.29 | 0.19 | 0.17 | 0.17 |
| TRIE1p | 0.48 | 0.34 | 0.33 | 0.30 |
| ARRAY1p | 0.14 | 0.13 | 0.11 | 0.13 |
| ACRBT1a | 0.79 | 0.45 | 0.40 | 0.34 |
| CST1a | 0.34 | 0.24 | 0.21 | 0.19 |
| MULTIBIT1a | 0.29 | 0.18 | 0.17 | 0.16 |
| MULTIBITb1a | 0.15 | 0.12 | 0.12 | 0.11 |
| PST1a | 0.42 | 0.23 | 0.18 | 0.19 |
| PBOB1a | 0.26 | 0.17 | 0.16 | 0.14 |
| TRIE1a | 0.40 | 0.24 | 0.24 | 0.21 |
| ACRBT2p | 1.01 | 0.78 | 0.75 | 0.74 |
| CST2p | 0.47 | 0.40 | 0.42 | 0.42 |
| MULTIBIT2p | 0.37 | 0.31 | 0.33 | 0.32 |
| MULTIBITb2p | 0.21 | 0.18 | 0.19 | 0.19 |
| PST2p | 0.45 | 0.32 | 0.28 | 0.27 |
| PBOB2p | 0.28 | 0.17 | 0.18 | 0.16 |
| TRIE2p | 0.48 | 0.31 | 0.33 | 0.28 |
| ARRAY2p | 0.15 | 0.12 | 0.10 | 0.12 |
| ACRBT2a | 0.79 | 0.47 | 0.40 | 0.37 |
| CST2a | 0.33 | 0.24 | 0.21 | 0.21 |
| MULTIBIT2a | 0.29 | 0.19 | 0.17 | 0.16 |
| MULTIBITb2a | 0.15 | 0.11 | 0.12 | 0.11 |
| PST2a | 0.42 | 0.23 | 0.19 | 0.19 |
| PBOB2a | 0.26 | 0.16 | 0.15 | 0.14 |
| TRIE2a | 0.39 | 0.24 | 0.22 | 0.21 |
| ACRBTIP | 0.71 | 0.53 | 0.49 | 0.48 |
| CSTIP | 0.18 | 0.17 | 0.16 | 0.17 |

TABLE 10

Average search time (in μsec) (hash schemes) for PSUEDOTRACE

| Scheme | Paix | Pb | Aads | MaeWest |
|---|---|---|---|---|
| ACRBT2aH | 0.89 | 0.51 | 0.45 | 0.41 |
| CST2aH | 0.39 | 0.29 | 0.25 | 0.24 |
| MULTIBIT2aH | 0.36 | 0.23 | 0.21 | 0.20 |
| MULTIBITb2aH | 0.18 | 0.14 | 0.15 | 0.14 |
| PST2aH | 0.52 | 0.33 | 0.26 | 0.25 |
| PBOB2aH | 0.38 | 0.23 | 0.20 | 0.19 |
| TRIE2aH | 0.48 | 0.34 | 0.28 | 0.27 |

The measured average search times were considered for only the NONTRACE and PSEUDOTRACE data sets. The use of the OLDP, TLDP, and/or INTP schemes of the present invention reduce the average search time in all cases other than MULTIBIT1p, MULTIBITb1p, MULTIBIT2p, MULTIBITb2p and MULTIBITb2aH, and some of the remaining MULTIBIT cases. For Paix, for example, the MULTIBITb1a search time is 14% larger than that for MULTIBIT on the NONTRACE data set and 50% larger on the PSEUDOTRACE data set. The average search for MULTIBIT2a on the MaeWest database is 27% less than that for MULTIBIT when either the NONTRACE or PSEUDOT-RACE data set is used.

The deterioration in performance when partitioning is applied to MULTIBIT and MULTIBITb is to be expected, because partitioning does not reduce the number of cache misses for any search. For example, the height of MULTIBIT is 4 and that of MULTIBITb is 3. Thus, no search in MULTI- BIT results in more than 5 cache misses and in MULTIBITb, no search causes more than 4 cache misses. To search MULTIBIT1p, for example, in the worst case, OLDP[i] is searched (5 cache misses including one to examine the overall root) as well as OLDP[−1] (4 cache misses).

For the Paix database and the NONTRACE data set PBOB1a and PBOB2a both have a search time that is 37% less than that of PBOB. Although the search time for PBOB2aH is 31% larger than that for PBOB2a, the time is 17% less than that for PBOB. This finding is important in that it demonstrates the efficacy of the hashing scheme for situations (such as IPv6 with s=64) in which it is not practical to use an array for the OLDP node.

Further, the average search time is considerably lower for the PSEUDOTRACE data set than for the NONTRACE data set because of the reduction in average number of cache misses per search when the search sequence is bursty. By increasing the burstiness using PSEUDOTRACE100, the average search time was reduced even further (Table 11 and FIG. 10C).

TABLE 11

Search time (in μsec) for PSUEDOTRACE100

| Scheme | Paix | Pb | Aads | MaeWest |
|---|---|---|---|---|
| ACRBT | 0.38 | 0.31 | 0.30 | 0.32 |
| CST | 0.22 | 0.21 | 0.21 | 0.25 |
| MULTIBIT | 0.14 | 0.13 | 0.13 | 0.13 |
| MULTIBITb | 0.07 | 0.07 | 0.07 | 0.07 |
| PST | 0.33 | 0.31 | 0.29 | 0.30 |
| PBOB | 0.33 | 0.27 | 0.27 | 0.26 |
| TRIE | 0.47 | 0.43 | 0.42 | 0.40 |
| ACRBT1p | 0.30 | 0.25 | 0.24 | 0.23 |
| CST1p | 0.17 | 0.16 | 0.16 | 0.16 |
| MULTIBIT1p | 0.16 | 0.14 | 0.15 | 0.14 |
| MULTIBITb1p | 0.12 | 0.11 | 0.11 | 0.11 |
| PST1p | 0.17 | 0.15 | 0.16 | 0.17 |
| PBOB1p | 0.16 | 0.13 | 0.13 | 0.15 |
| TRIE1p | 0.27 | 0.24 | 0.24 | 0.24 |
| ARRAY1p | 0.12 | 0.10 | 0.09 | 0.11 |
| ACRBT2p | 0.30 | 0.26 | 0.26 | 0.25 |
| CST2p | 0.18 | 0.16 | 0.17 | 0.16 |
| MULTIBIT2p | 0.16 | 0.15 | 0.15 | 0.15 |
| MULTIBITb2p | 0.12 | 0.11 | 0.11 | 0.11 |
| PST2p | 0.18 | 0.15 | 0.17 | 0.18 |
| PBOB2p | 0.16 | 0.13 | 0.12 | 0.15 |
| TRIE2p | 0.26 | 0.24 | 0.23 | 0.24 |
| ARRAY2p | 0.12 | 0.11 | 0.10 | 0.09 |

For the NONTRACE data set, ARRAY1p and ARRAY2p had the best search time. For the PSEUDOTRACE and PSEUDOTRACE100 data sets, MULTIBITb was fastest and ARRAY1p and ARRAY2p came in next. Although the base ARRAY structure has an O(n) search time complexity, the use of partitioning enables the (partitioned) ARRAY scheme to be highly competitive.

Figure 10A:
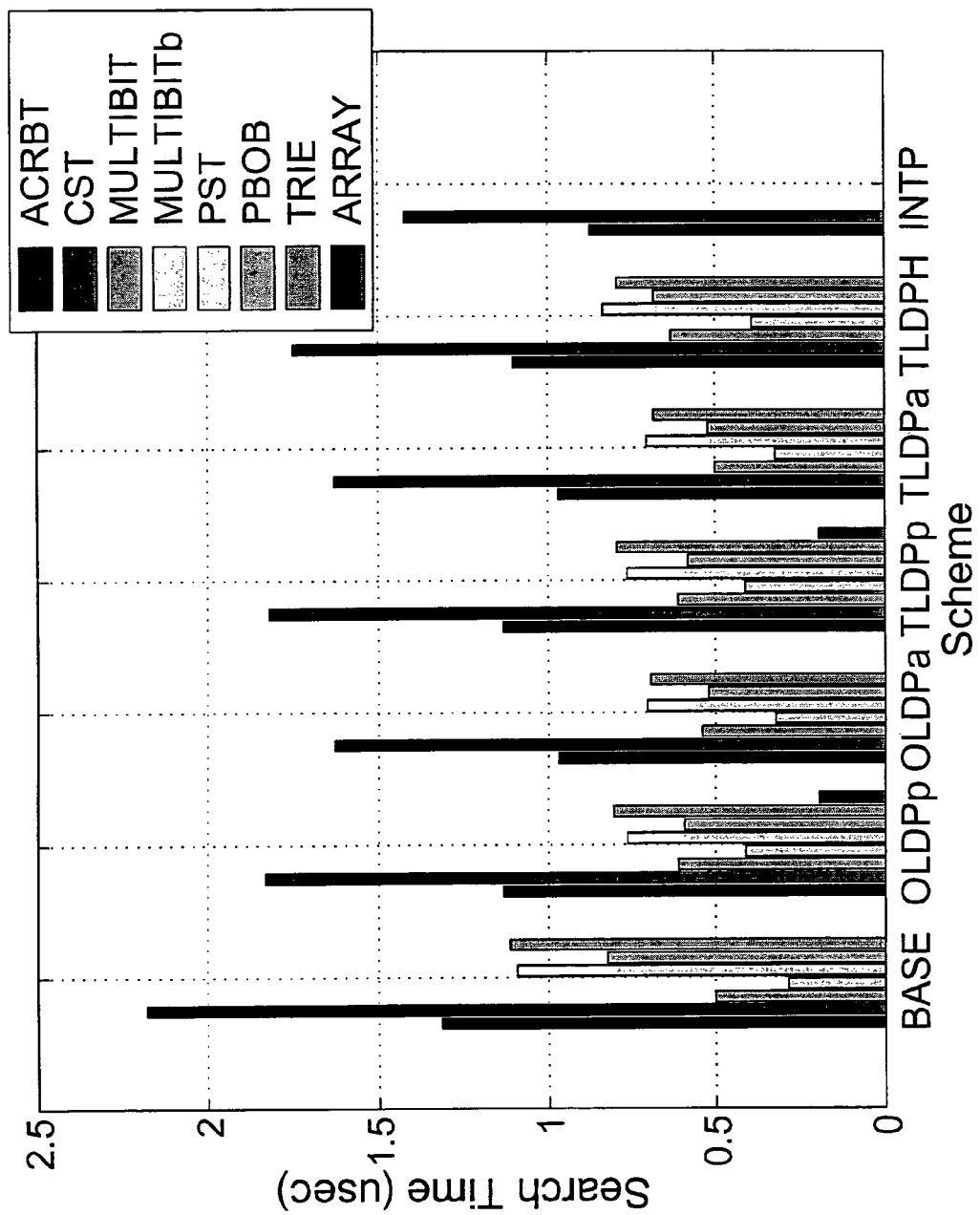
FIGS. 10A through 10D represent histograms of the average time for PAIX.
Figure 10B:
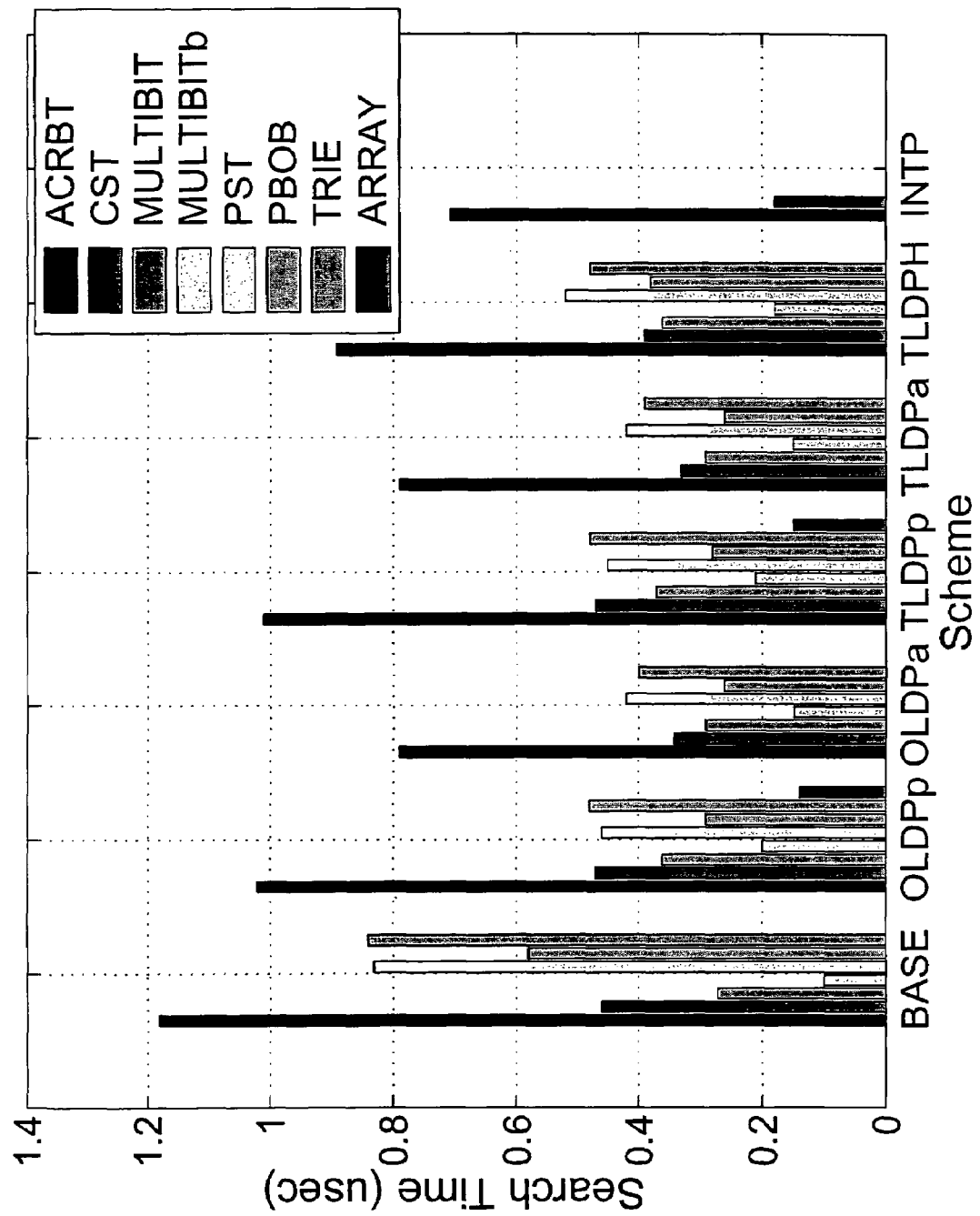
Figure 10C:
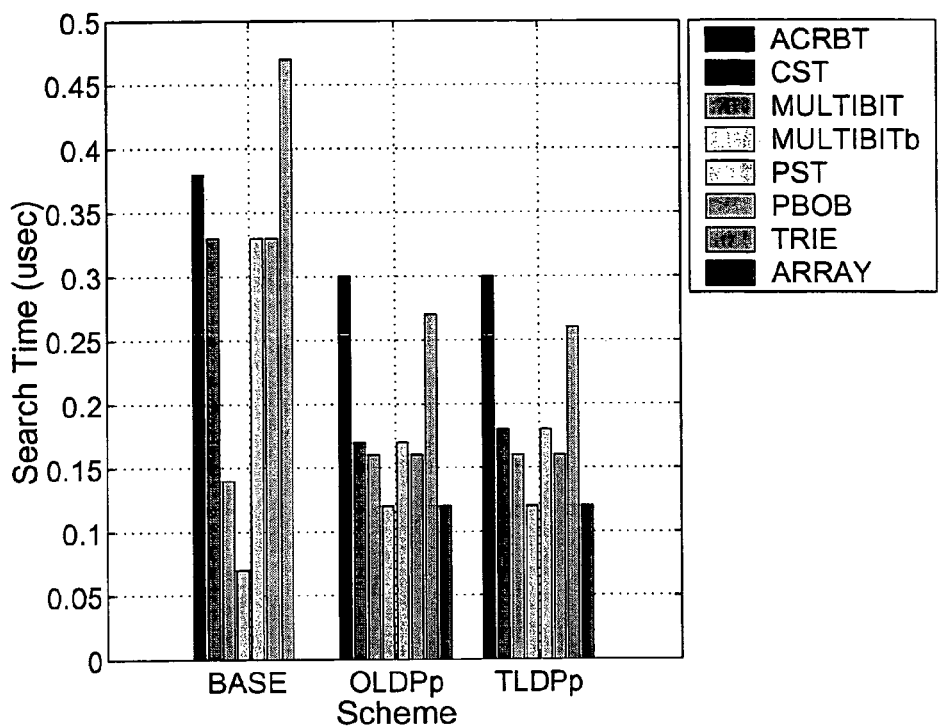
Figure 10D:
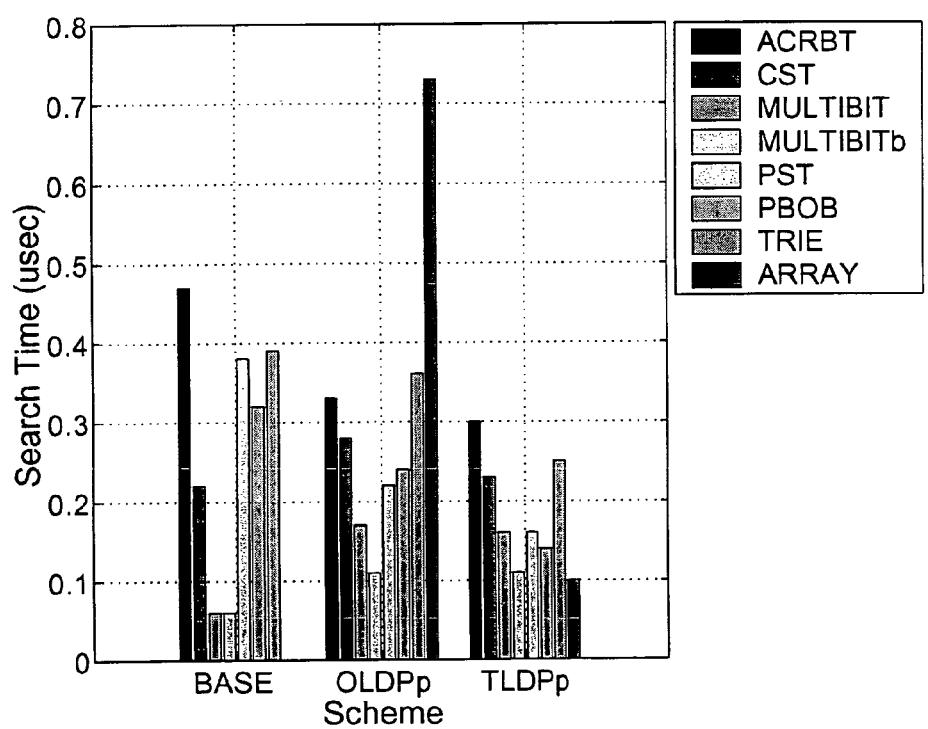

When the NONTRACE, PSEUDOTRACE and PSEUDOTRACE100 data sets were used, X1p and X2p have similar average search times. The same is true for X1a and X2a. Hence, there is only a small probability that a destination address in NONTRACE and PSEUDOTRACE will require examination of OLDP[−1]. To demonstrate the effectiveness of the TLDP scheme, the search sequence PSEUDOTRACE100L16 was used in which search requires the examination of OLDP[−1]. The experimental data of Table 12 and FIG. 10D illustrate that the X2p schemes significantly outperform their X1p counterparts. For the Paix database, the average search time for ARRAY2p is 14% that for ARRAY1p whereas for PBOB2p, the time is 67% that for PBOB1p.

TABLE 12

Search time (in μsec) for PSUEDOTRACE100L16

| Scheme | Paix | Pb | Aads | MaeWest |
|---|---|---|---|---|
| ACRBT | 0.47 | 0.40 | 0.38 | 0.36 |
| CST | 0.22 | 0.21 | 0.21 | 0.26 |
| MULTIBIT | 0.06 | 0.06 | 0.05 | 0.06 |
| MULTIBITb | 0.06 | 0.04 | 0.05 | 0.05 |
| PST | 0.38 | 0.28 | 0.28 | 0.27 |
| PBOB | 0.32 | 0.21 | 0.25 | 0.24 |
| TRIE | 0.39 | 0.35 | 0.34 | 0.33 |
| ACRBT1p | 0.33 | 0.25 | 0.26 | 0.23 |
| CST1p | 0.28 | 0.26 | 0.28 | 0.27 |
| MULTIBIT1p | 0.17 | 0.15 | 0.16 | 0.16 |
| MULTIBITb1p | 0.11 | 0.11 | 0.11 | 0.11 |
| PST1p | 0.22 | 0.18 | 0.18 | 0.18 |
| PBOB1p | 0.24 | 0.19 | 0.19 | 0.19 |
| TRIE1p | 0.36 | 0.30 | 0.31 | 0.29 |
| ARRAY1p | 0.73 | 0.30 | 0.29 | 0.38 |
| ACRBT2p | 0.30 | 0.25 | 0.24 | 0.23 |
| CST2p | 0.23 | 0.22 | 0.22 | 0.21 |
| MULTIBIT2p | 0.16 | 0.14 | 0.14 | 0.14 |
| MULTIBITb2p | 0.11 | 0.11 | 0.10 | 0.10 |
| PST2p | 0.16 | 0.13 | 0.13 | 0.13 |
| PBOB2p | 0.14 | 0.13 | 0.12 | 0.12 |
| TRIE2p | 0.25 | 0.21 | 0.22 | 0.21 |
| ARRAY2p | 0.10 | 0.08 | 0.08 | 0.09 |

Insert Time

Figure 11:
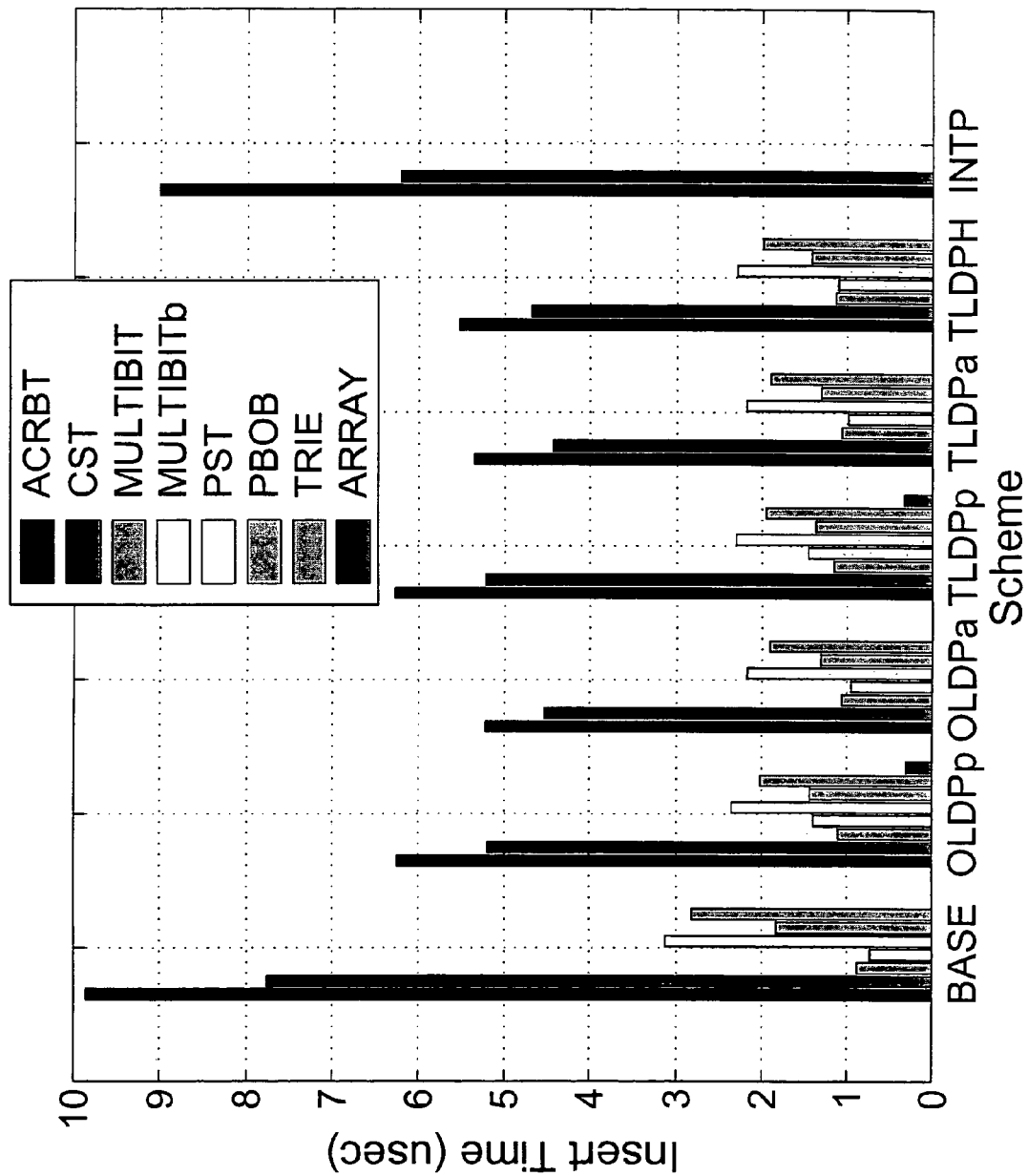
FIG. 11 is a histogram of the average prefix insertion time for PAIX.

To measure the average insert time for each of the data structures, a random permutation of the prefixes was obtained in each of the databases. Next, the first 75% of the prefixes in this random permutation were inserted into an initially empty data structure. The time to insert the remaining 25% of the prefixes was measured and averaged. This timing experiment was repeated 10 times. Tables 13 and 14 for Paix. FIG. 11 histograms the average times of Tables 13 and 14 for Paix.

TABLE 13

Average time to insert a prefix (in μsec)

| Scheme | Paix | Pb | Aads | MaeWest |
|---|---|---|---|---|
| ACRBT | 9.86 | 10.73 | 10.37 | 10.20 |
| CST | 7.76 | 6.35 | 5.95 | 5.90 |
| MULTIBIT | 0.88 | 0.95 | 0.97 | 0.96 |
| MULTIBITb | 0.73 | 1.07 | 1.22 | 1.26 |
| PST | 3.13 | 2.60 | 2.45 | 2.05 |
| PBOB | 1.83 | 1.54 | 1.48 | 1.23 |
| TRIE | 2.82 | 2.31 | 2.27 | 2.02 |
| ACRBT1p | 6.24 | 4.96 | 4.70 | 4.69 |
| CST1p | 5.18 | 4.16 | 3.98 | 4.00 |
| MULTIBIT1p | 1.10 | 1.17 | 1.24 | 1.13 |
| MULTIBITb1p | 1.40 | 2.33 | 2.58 | 2.52 |
| PST1p | 2.35 | 1.93 | 1.77 | 1.52 |
| PBOB1p | 1.44 | 1.17 | 1.10 | 0.94 |
| TRIE1p | 2.02 | 1.61 | 1.51 | 1.36 |
| ARRAY1p | 0.30 | 0.26 | 0.28 | 0.27 |
| ACRBT1a | 5.21 | 3.23 | 2.90 | 2.86 |
| CST1a | 4.52 | 2.77 | 2.40 | 2.38 |
| MULTIBIT1a | 1.06 | 0.88 | 0.98 | 0.75 |
| MULTIBITb1a | 0.95 | 0.91 | 1.01 | 0.90 |
| PST1a | 2.17 | 1.67 | 1.52 | 1.32 |
| PBOB1a | 1.31 | 0.98 | 0.91 | 0.76 |
| TRIE1a | 1.91 | 1.47 | 1.34 | 1.18 |
| ACRBT2p | 6.27 | 4.95 | 4.67 | 4.69 |
| CST2p | 5.21 | 4.12 | 3.95 | 4.00 |
| MULTIBIT2p | 1.15 | 1.26 | 1.29 | 1.26 |
| MULTIBITb2p | 1.46 | 2.50 | 2.64 | 2.56 |
| PST2p | 2.30 | 1.92 | 1.76 | 1.50 |
| PBOB2p | 1.37 | 1.15 | 1.08 | 0.93 |
| TRIE2p | 1.95 | 1.60 | 1.48 | 1.35 |
| ARRAY2p | 0.32 | 0.24 | 0.29 | 0.25 |

TABLE 13-continued

Average time to insert a prefix (in μsec)

| Scheme | Paix | Pb | Aads | MaeWest |
|---|---|---|---|---|
| ACRBT2a | 5.35 | 3.28 | 2.81 | 2.80 |
| CST2a | 4.42 | 2.73 | 2.41 | 2.34 |
| MULTIBIT2a | 1.06 | 0.97 | 0.96 | 0.92 |
| MULTIBITb2a | 0.98 | 1.00 | 1.10 | 0.98 |
| PST2a | 2.18 | 1.64 | 1.50 | 1.29 |
| PBOB2a | 1.30 | 1.00 | 0.90 | 0.75 |
| TRIE2a | 1.90 | 1.43 | 1.34 | 1.17 |
| ACRBTIP | 9.01 | 7.98 | 7.53 | 7.45 |
| CSTIP | 6.21 | 5.19 | 4.90 | 4.81 |

TABLE 14

Average time to insert a prefix (in μsec) (hash schemes)

| Scheme | Paix | Pb | Aads | MaeWest |
|---|---|---|---|---|
| ACRBT2aH | 5.53 | 3.54 | 3.10 | 3.01 |
| CST2aH | 4.67 | 2.98 | 2.60 | 2.54 |
| MULTIBIT2aH | 1.13 | 1.09 | 1.04 | 0.99 |
| MULTIBITb2aH | 1.10 | 1.08 | 1.17 | 1.06 |
| PST2aH | 2.29 | 1.75 | 1.59 | 1.42 |
| PBOB2aH | 1.42 | 1.08 | 0.97 | 0.85 |
| TRIE2aH | 1.99 | 1.53 | 1.42 | 1.25 |

The insert experiments demonstrate that ARRAY1p and ARRAY2p are performed with the least time. When the partitioning operation is performed using base structures whose worst-case performance is better than O(n), the PBOB2a, MULTIBIT2a and MULTIBITb2a structures are competitive in time and achieve the best time for this operation. For example, while an insert in the Paix database takes 19% less time when MULTIBIT2a is used than when a PBOB2a is used, that in the MaeWest takes 15% more time. Generally, the use of OLDP, TLDP, and/or INTP of the present invention reduces the insert time. MULTIBIT1p, MULTIBITb1p, MULTIBIT2p, and MULTIBITb2p are exceptions, taking more time for inserts in each of the four databases. MULTIBIT1a, MULTIBITb1a, MULTIBIT2a, and MULTIBITb2a took more time than their base structures on some of the databases and less on others. The insert time for MULTIBIT is about 20% less than that for MULTIBIT1a. In contrast, the insert time for PBOB2a is between 29% and 39% less than that for PBOB.

Delete Time

Figure 12:
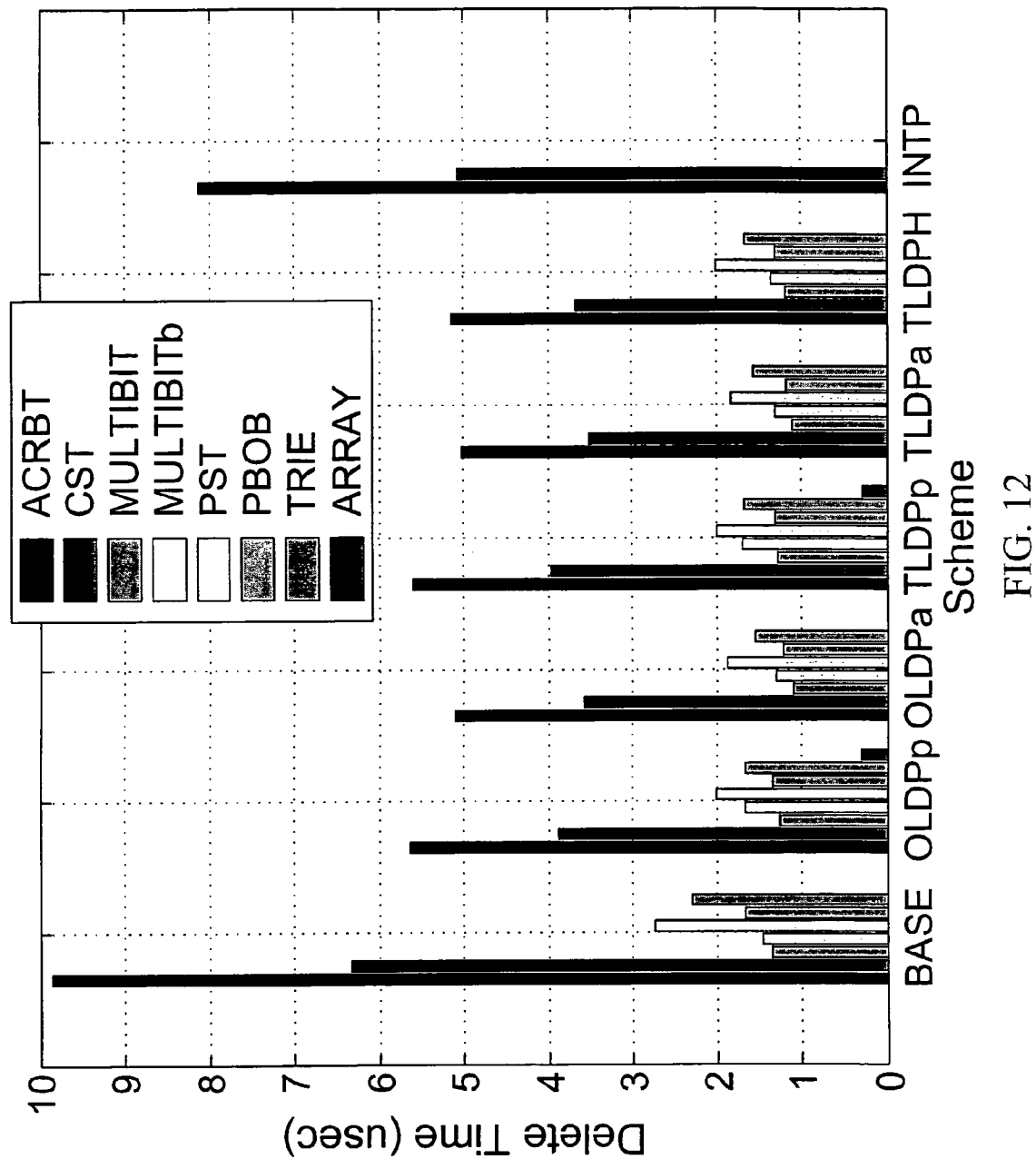
FIG. 12 is a histogram of the deletion time for PAIX.

To measure the average delete time, 25% of the prefixes was removed from the data structure for each database. The prefixes to delete were determined using the permutation generated for the insert time test; the last 25% of these were deleted. Once again, the test was run 10 times and the average of the averages computed. Tables 15 and 16 show the average time to delete a prefix over the 10 test runs. FIG. 12 histograms the average times of Tables 15 and 16 for Paix.

TABLE 15

Average time to delete a prefix (in μsec)

| Scheme | Paix | Pb | Aads | MaeWest |
|---|---|---|---|---|
| ACRBT | 9.86 | 10.73 | 10.37 | 10.20 |
| CST | 6.34 | 5.09 | 4.98 | 4.84 |
| MULTIBIT | 1.34 | 1.80 | 2.09 | 2.06 |
| MULTIBITb | 1.46 | 2.01 | 2.43 | 2.44 |

TABLE 15-continued

Average time to delete a prefix (in μsec)

| Scheme | Paix | Pb | Aads | MaeWest |
|---|---|---|---|---|
| PST | 2.74 | 2.27 | 2.12 | 1.74 |
| PBOB | 1.67 | 1.40 | 1.31 | 1.10 |
| TRIE | 2.30 | 1.81 | 1.75 | 1.58 |
| ACRBT1p | 5.64 | 4.33 | 4.03 | 3.97 |
| CST1p | 3.89 | 3.04 | 2.98 | 2.84 |
| MULTIBIT1p | 1.25 | 1.30 | 1.27 | 1.37 |
| MULTIBITb1p | 1.67 | 2.03 | 2.18 | 2.13 |
| PST1p | 2.01 | 1.69 | 1.55 | 1.33 |
| PBOB1p | 1.33 | 1.14 | 1.06 | 0.91 |
| TRIE1p | 1.67 | 1.27 | 1.18 | 1.11 |
| ARRAY1p | 0.30 | 0.24 | 0.20 | 0.22 |
| ACRBT1a | 5.10 | 3.31 | 2.68 | 2.71 |
| CST1a | 3.57 | 2.20 | 2.04 | 1.97 |
| MULTIBIT1a | 1.09 | 0.88 | 0.71 | 0.75 |
| MULTIBITb1a | 1.29 | 1.03 | 1.04 | 0.97 |
| PST1a | 1.88 | 1.41 | 1.27 | 1.14 |
| PBOB1a | 1.21 | 0.90 | 0.79 | 0.70 |
| TRIE1a | 1.55 | 1.14 | 1.05 | 0.90 |
| ACRBT2p | 5.60 | 4.20 | 3.92 | 3.92 |
| CST2p | 3.97 | 3.00 | 2.91 | 2.87 |
| MULTIBIT2p | 1.27 | 1.29 | 1.29 | 1.30 |
| MULTIBITb2p | 1.70 | 2.06 | 2.22 | 2.16 |
| PST2p | 2.00 | 1.69 | 1.56 | 1.32 |
| PBOB2p | 1.30 | 1.13 | 1.04 | 0.90 |
| TRIE2p | 1.68 | 1.26 | 1.18 | 1.08 |
| ARRAY2p | 0.28 | 0.24 | 0.21 | 0.22 |
| ACRBT2a | 5.02 | 3.09 | 2.75 | 2.67 |
| CST2a | 3.51 | 2.15 | 2.03 | 1.98 |
| MULTIBIT2a | 1.10 | 0.84 | 0.79 | 0.76 |
| MULTIBITb2a | 1.30 | 1.00 | 0.98 | 0.95 |
| PST2a | 1.83 | 1.40 | 1.29 | 1.11 |
| PBOB2a | 1.17 | 0.88 | 0.80 | 0.68 |
| TRIE2a | 1.57 | 1.14 | 1.04 | 0.86 |
| ACRBTIP | 8.13 | 7.17 | 6.76 | 6.65 |
| CSTIP | 5.06 | 4.26 | 4.16 | 4.09 |

TABLE 16

Average time to delete a prefix (in μsec) (hash schemes)

| Scheme | Paix | Pb | Aads | MaeWest |
|---|---|---|---|---|
| ACRBT2aH | 5.14 | 3.18 | 2.81 | 2.77 |
| CST2aH | 3.67 | 2.25 | 2.08 | 2.03 |
| MULTIBIT2aH | 1.18 | 0.91 | 0.87 | 0.84 |
| MULTIBITb2aH | 1.35 | 1.07 | 1.05 | 0.97 |
| PST2aH | 2.01 | 1.50 | 1.37 | 1.18 |
| PBOB2aH | 1.30 | 0.97 | 0.97 | 0.77 |
| TRIE2aH | 1.67 | 1.23 | 1.13 | 1.00 |

As can be seen, the use of OLDP, TLDP, and/or interval partitioning schemes of the present invention generally resulted in a reduction in the delete time, with the exceptions being MULTIBITb1p and MULTIBITb2p with Paix and Pb. TLDP with array linear lists (i.e., the schemes X2a where X denotes a base scheme such as ACRBT) resulted in the smallest delete times for each of the tested base data structures. The delete time for MULTIBIT2a was between 19% and 62% less than that for MULTIBIT; for PBOB2a, the delete time was between 30% and 39% less than that for PBOB. As was the case for the search and insert operations, ARRAY1p and ARRAY2p have the least measured average delete time. From among the remaining structures, the delete time is the least for MULTIBIT1a, MULTIBIT2a and PBOB2a. For example, on the Paix database, a delete using MULTIBIT2a takes about 6% less time than when PBOB2a is used; on the MaeWest database, a delete using MULTIBIT2a takes about 12% more time than when PBOB2a is used.

EXAMPLE 1

Prefix Partitions Represented by Priority Search Trees

The present invention uses priority search trees to represent dynamic prefix-router tables to reduce the processing time required to search, insert, and delete tuples. In one embodiment, the present invention uses priority search trees to perform prefix routing, wherein the best-matching prefix is the most-specific matching prefix (the range analog of the longest-matching prefix). Because a prefix is implicitly a range, it is unnecessary to assess intersection or conflicts in ranges.

Figure 13:
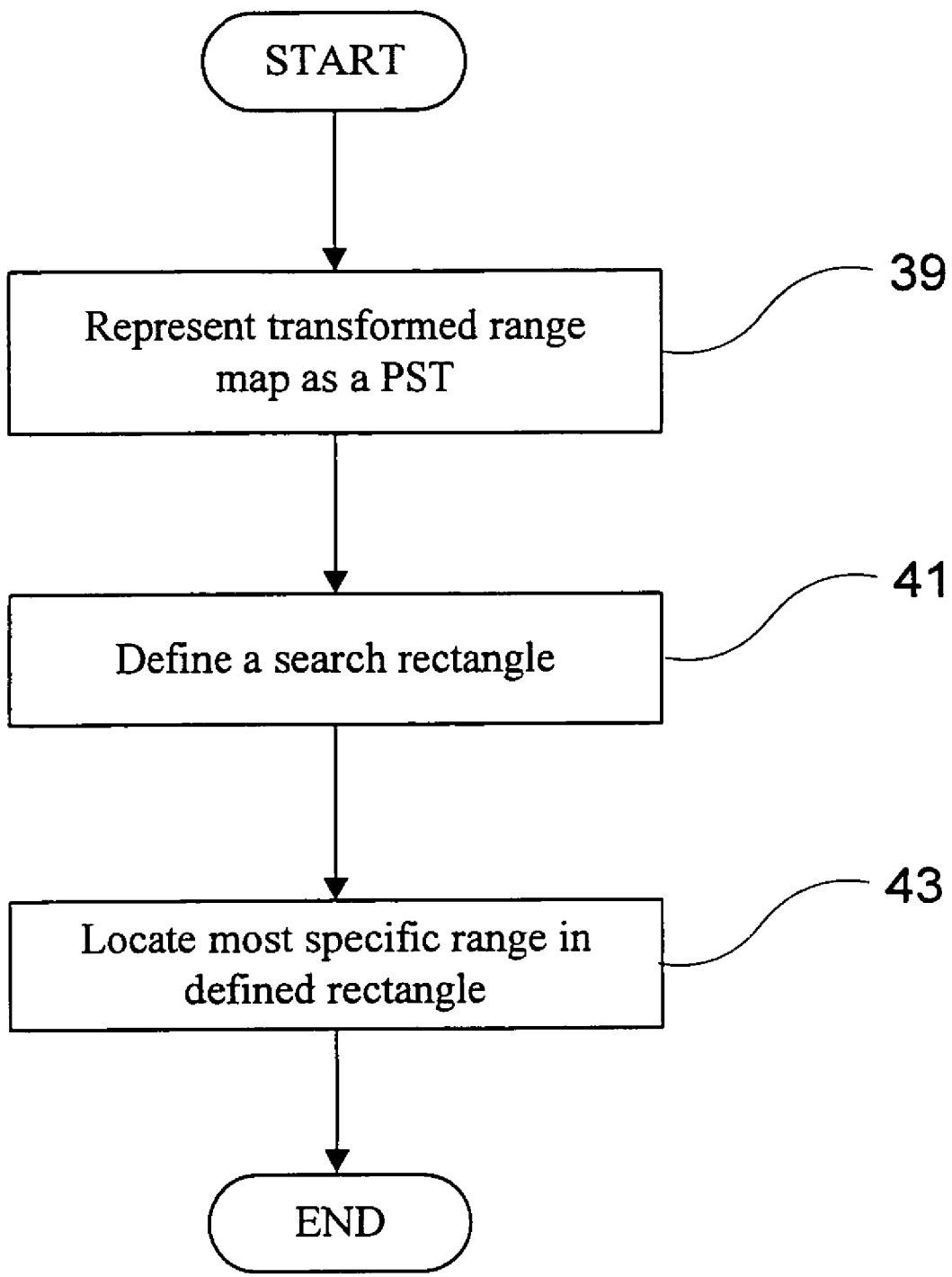
FIG. 13 is a flow chart illustrating the steps for finding most specific ranges according to the current invention.

To determine the most specific matching prefix, R is established as a set of ranges such that each range represents an address prefix. As illustrated in FIG. 13, the range (prefix) is represented as PST 39. By operating on the PST to define a rectangle 41 comprising the prefixes associated with the desired destination address, the most specific range (prefix) can then be found by locating the point in the defined rectangle 43 having the least x-value. Using this method, the longest prefix is located in the dynamic router table. To insert a prefix into the router data table, the range is mapped and transformed as described above, and the transformed range is inserted into the PST. To delete a prefix, the transformed range is removed from the PST. When the PST is an RBPST, each search, insert, and delete action is performed in O(log n) time.

The following examples explain how prefixes are routed in accordance with the present invention and as illustrated in FIG. 13.

Prefix Lookup Using the Priority Search Tree Data Structure

The set of ranges R, is conflict free and includes the range that corresponds to a prefix. With this assumption, the msr (d)—most specific range of R that matches destination address (d)—is defined for every destination address d (i.e., cannot equal zero) and is the conflict free range set defined as [maxStart(ranges(d)), minFinish(ranges(d))].

To obtain the most specific range of R, a priority search tree (PST1) is applied to the range (prefix) point set. For example, using a red-black priority-search tree (RBPST) where ranges (d) is given by the points that lie in a rectangle (including points on the boundary) defined by $x_{left}$=d, $x_{right}$=∞, $y_{top}$=d, and $y_{bottom}$=0, these points are obtained using the enumerateRectangle($x_{left}$,$x_{right}$,$y_{top}$)=enumerateRectangle(d, ∞, d) of a data structure where $y_{bottom}$ is implicit and is always 0. Thus, by applying the enumerateRectangle($x_{left}$,$x_{right}$,$y_{top}$) operation, that being enumerateRectangle($2^W$d−d+$2^W$−1,∞, d), the ranges(d) of the msr(d) are provided.

Then, the most specific range (prefix lookup routing) is determined by performing the operation minXinRectangle ($x_{left}$,$x_{right}$,$y_{top}$) on the ranges(d) provided.

Prefix Insertion Using the Priority Search Tree Data Structure

After performing the prefix lookup routing as described above, a prefix whose range in [u,v] is inserted by performing the operation transform1(map1 ([u,v])) into PST1. Where the prefix ([u,v]) is already in PST1, the next-hop information is updated for this prefix in PST1.

Prefix Deletion Using the Priority Search Tree Data Structure

In accordance with the present invention, a request to delete a prefix results in setting the next-hop associated with this prefix to zero. Thus, the deletion of a prefix does not delete the prefix from PST1.

EXAMPLE 2

Interval Partitions Using BIT and CPT

In one embodiment of the invention, a front-end basic-interval tree (BIT) and a collection of prefix trees are used to perform routing operations (i.e., lookup) on interval-based partitions. The prefix trees (also termed back-end prefix trees or CPT) are constructed for each of the prefixes in the router table. The prefix tree for prefix P comprises a header node plus one node, called a prefix node, for every nontrivial prefix (i.e., a prefix whose start and end points are different) or basic interval x such that next(x)=P. The header node identifies the prefix P for which this is the prefix tree.

Figure 14B:
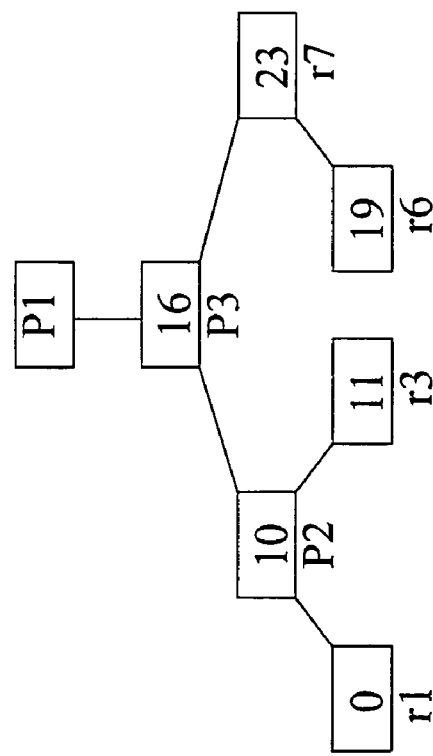
FIGS. 14A through 14F illustrate various router table data structures that can be used with the interval partitioning scheme of the present invention.
Figure 14A:
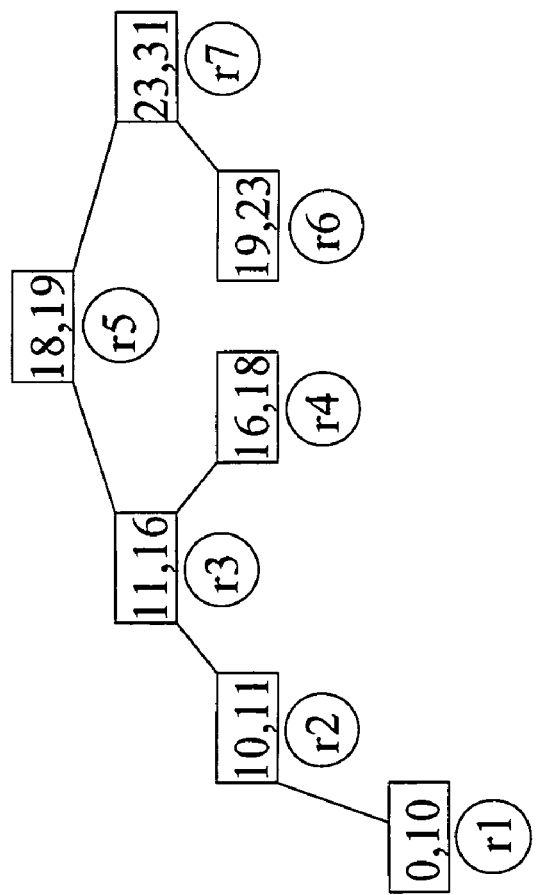
Figure 14F:
Figure 14E:
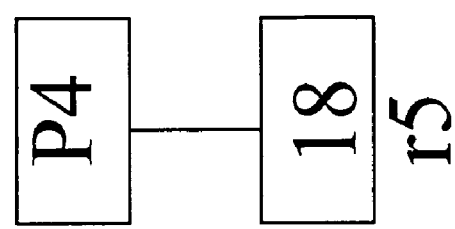
Figure 14D:
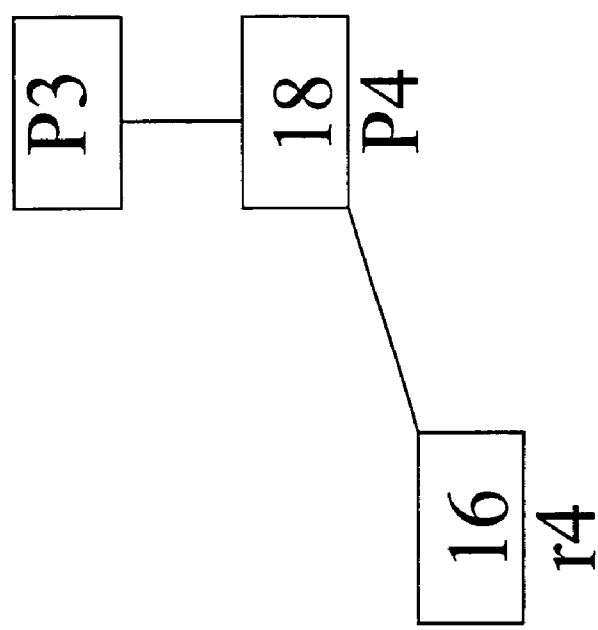
Figure 14C:
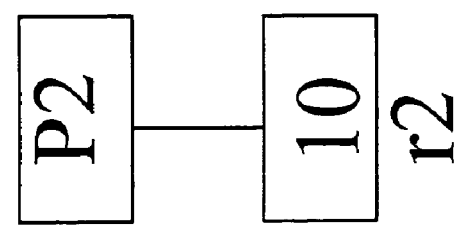

As illustrated in FIG. 14A, a BIT is provided for the five prefix example of Table 4. The pointers to prefix-tree nodes are shown in the circle outside each node. In FIGS. 14B, 14C, 14D, 14E, and 14F, the back-end prefix trees for the five prefixes of Table 4 are illustrated. The prefix nodes of prefix trees of FIGS. 14B, 14C, 14D, 14E, and 14F store the start point of the range or prefix represented by that prefix node. The start points of the basic intervals and prefixes are shown inside the prefix nodes while the basic interval or prefix name is shown outside the node.

In accordance with the present invention, each BIT node stores a basic interval. Along with each basic interval, a pointer to the back-end prefix-tree node for the basic interval is stored. In one embodiment, a pointer corresponding to W-length prefixes is stored for the end points of the basic interval that correspond to prefixes whose length is W.

Routing Using the Interval Partitioning Scheme of the Present Invention

The present invention uses an interval partitioning scheme to represent dynamic prefix-router tables to reduce the processing time and memory required to search, insert, and delete prefixes. In one embodiment, the present invention uses binary priority search trees as back-end prefix trees.

To determine the longest matching prefix, the BIT is used to reach a BIT node that contains the basic interval of interest. The BIT node points to the node in the back-end tree for the prefix of interest. Should there not be a BIT node that contains the basic interval of interest, the rightmost basic interval in the BIT node is selected.

Insertion and deletion of prefixes is performed by inserting and removing end points from the BIT, respectively, and adding/removing a back-end prefix tree. The use of interval partitioning affects only the components of the insert/delete algorithms that deal with the BIT. The computer program instructions for implementing the schemes of the present invention can be derived from the following code. The code notation utilizes syntax from C++ programming language.

In accordance with the present invention, codes for determining the longest matching prefix, inserting a prefix, and deleting a prefix are as follows.

```
Algorithm lookup(d){
    //return lmp(d)
    p= first (d,s)
    if (partition[p].abit !=null && partition[p].start<=d)
        //containing basic interval is in partition[p].abit
        return partition[p].abit->lookup(d);
    else return partition[partition[p].previous].abit->rightmost
}
Algorithm insert(e){
    //insert the end point e
```

-continued

```
p = first (e,s)
if (partition[p].abit = null){
    //rn has interval that is split by e
    rn = partition[partition[p].previous].abit->rightmostNode( );
//split into 2 intervals
    partition[p].abit->new Node(e, rn->rightKey, rn->rightPrefix);
    rn->rightKey = e; rn->rightPrefix = null;
    //update next and previous fields of the partition table
    for (i=partition[p].previous; i<p; i++) partition[i].next = p;
    for (i=p+1; i<=partition[p].next; i++) partition[i].previous = p;
    }
    else{
        if (partition[p].start > e){
            rn = partition[partition[p].previous].abit->rightmostNode( );
            rn->rightKey = e; rn->rightPrefix = null;
        }
        partition[p].abit->insert(e);
    }
}
Algorithm delete(e){
    //delete the end point e
    p = first(e,s);
    if (partition[p].abit !=null){
        if (partition[p].start == e){
            //combine leftmost interval of p with rightmost of previous
            ln = partition[p].abit->leftmostNode( );
            rn = partition[partition[p].previous].abit->rightmostNode( );
            rn->rightKey = ln->rightKey; rn->rightPrefix = ln->rightPrefix;
        }
        partition[p].abit->delete(e);
        if (partition[p].abit == null){
            ///update next and previous fields of the partition table
            for (i=partition[p].previous; i<p; i++)
                partition[i].next = partition[p].next;
            for (i=p+1; i<=partition[p].next; i++)
                partition[i].previous = partition[p].previous;
        }
    }
}
```

Figure 15:
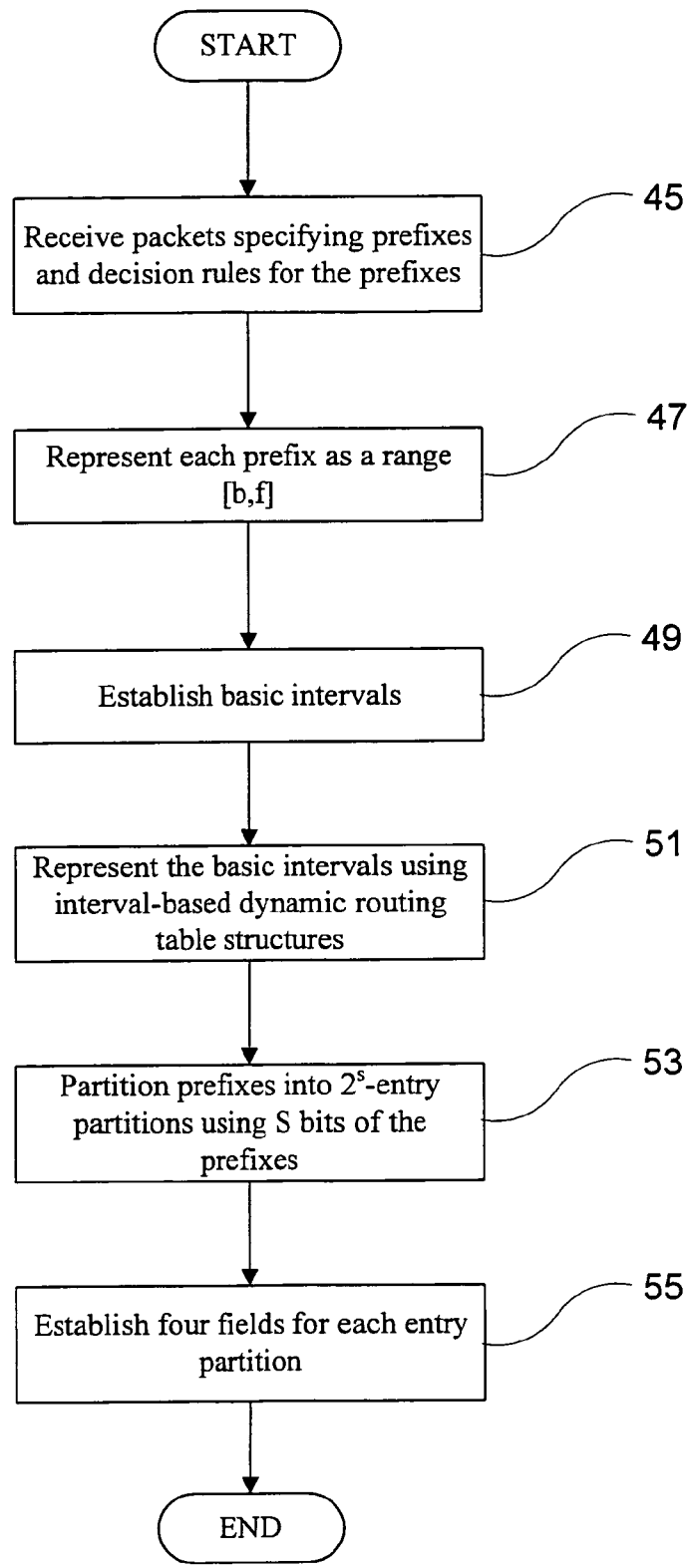
FIG. 15 is a flow chart illustrating the steps of using the interval partitioning scheme of the present invention.

Using the flow diagrams of FIGS. 15, 16, 17, and 18 the routing operations described above are illustrated. In FIG. 15, a routing table is constructed in accordance with the present invention. Packets specifying prefixes and decision rules for the prefixes are received 45. Each of the prefixes is then represented as a range [b,f] 47, where b is the start of the range for the prefix and f is the finish range for the prefix. Consecutive endpoints of the prefix ranges are used to establish basic intervals 49. Each of the basic intervals is represented using interval-based dynamic routing table structures 51. The prefixes are partitioned into $2^s$—entry partitions using s bits of the prefixes 53. For each partition, four fields are established 55: (a) next partition (representing the next nonempty partition); (b) previous (representing the previous nonempty partition); (c) pointer (representing the pointer to the dynamic routing table structure representing the basic intervals and corresponding prefixes); and (d) start (representing the smallest end point in the partition table).

Figure 16:
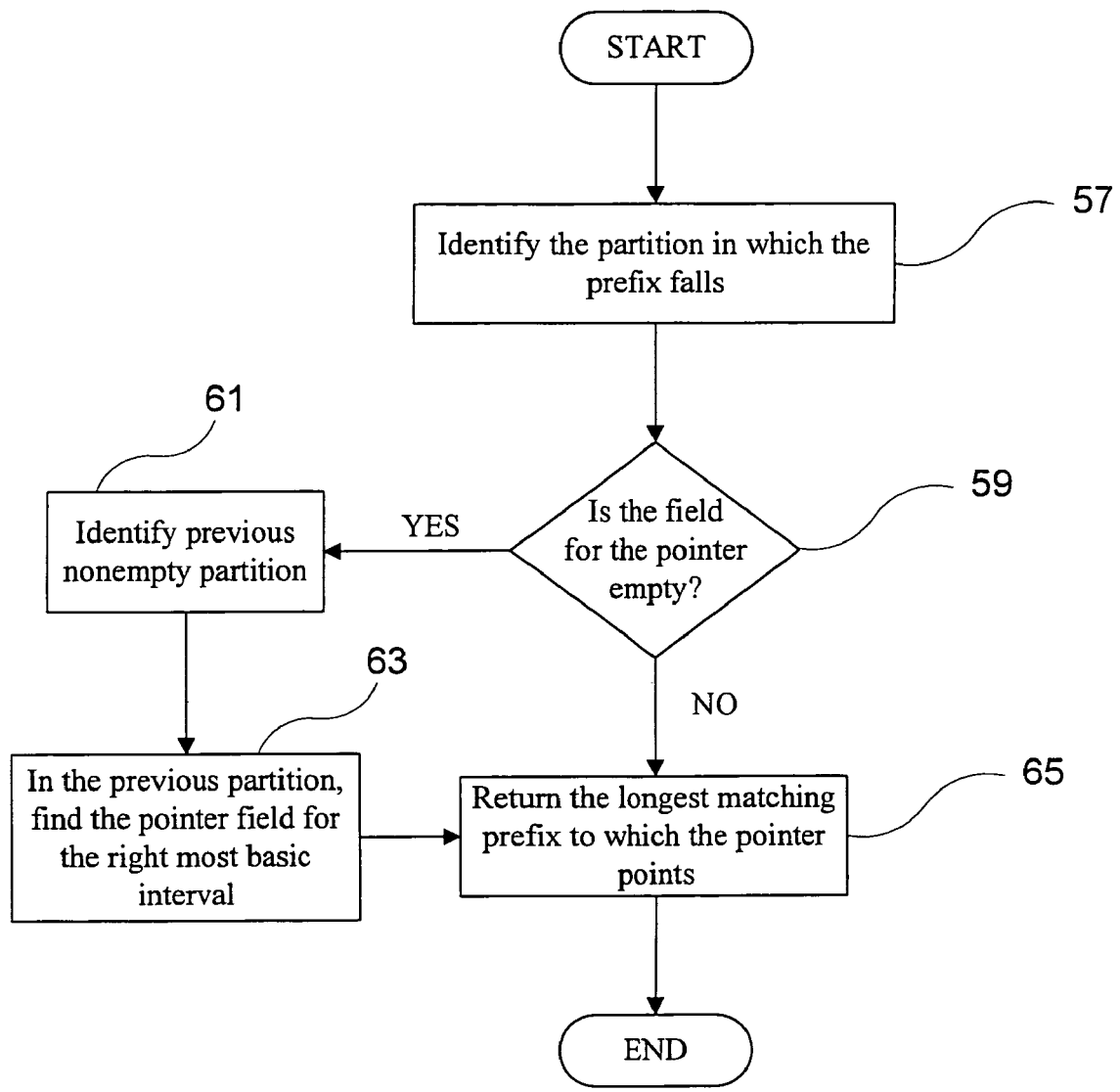
FIG. 16 is a flow chart illustrating the steps of performing the "lookup" router operation using the interval partitioning scheme of present invention.

As illustrated in FIG. 16, to find the longest matching prefix in an interval-based router table structure of the invention, the partition in which the desired prefix is located is determined 57. The partition is assessed to determine whether the field for the pointer is empty 59. If the pointer field is not empty, the longest matching prefix to which the pointer points is returned as the longest matching prefix 65. Where the pointer field is empty, the previous nonempty partition is identified 61 and the pointer field for the rightmost basic interval is determined 63. Once the pointer field is determined, the longest matching prefix to which the pointer points is returned 65.

Figure 17:
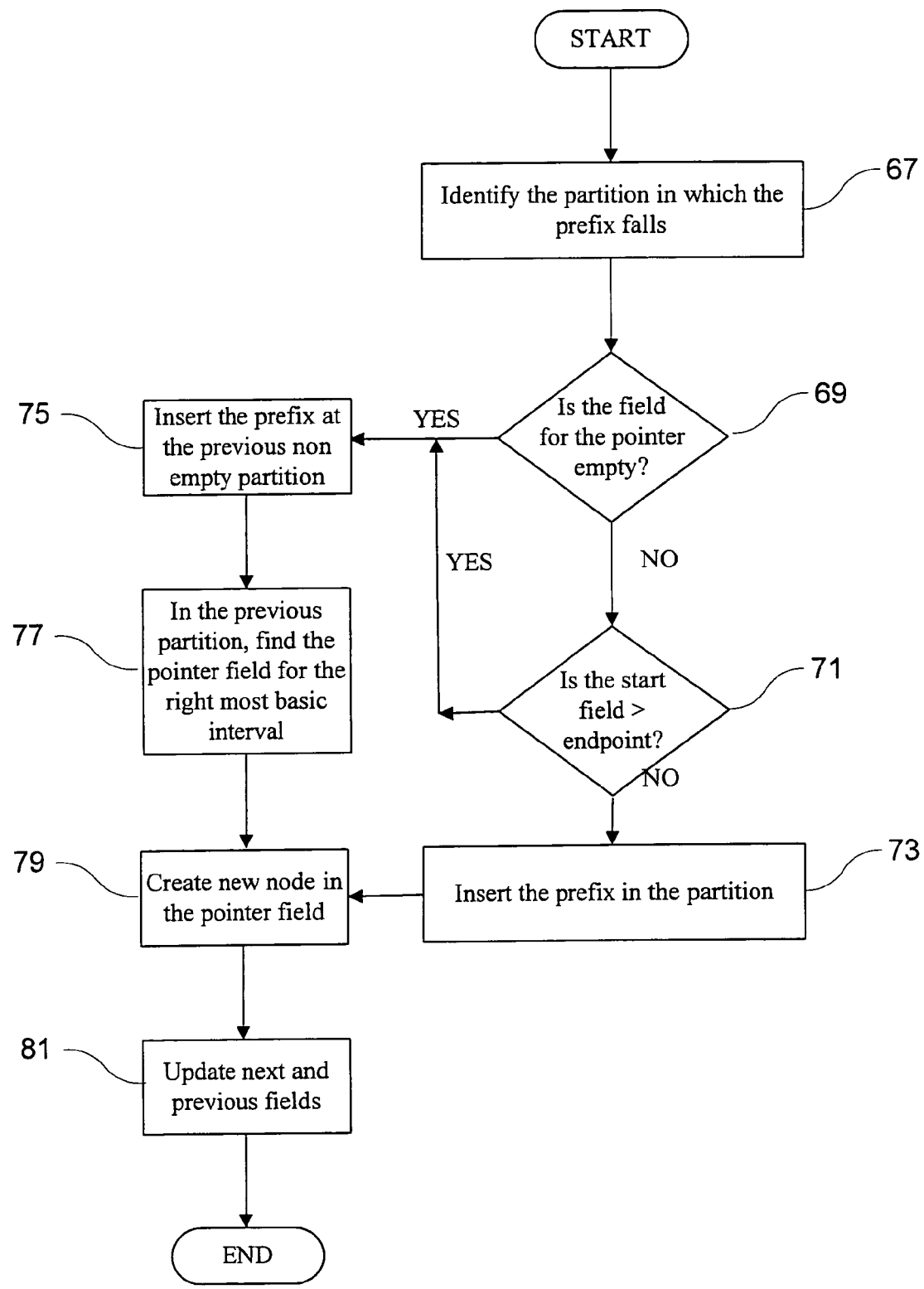
FIG. 17 is a flow chart illustrating the steps of performing the "insertion" router operation using the interval partitioning scheme of present invention.

To insert a prefix into a router table data structure using the interval partitioning scheme of the present invention, end-points are added from the BIT and/or the back-end prefix tree. As can be understood by the skilled artisan, the interval partitioning scheme of the invention only affects the insert routing operation at the BIT. As illustrated in FIG. 17, the partition into which the new prefix (endpoint) is to be inserted is identified 67. The partition is assessed to determine whether the field for the pointer is empty 69. If the pointer field is not empty, the start field is analyzed 71 to determine if it is greater than the endpoint to be inserted. Should the start field be less than the end point to be entered, the prefix is inserted into the partition 73 and a new node is created in the pointer field 79. The new and previous fields are then updated 81. Should the pointer field be empty or the start field be greater than the end point, the prefix is inserted at the previous non-empty partition 75, splitting the basic interval into two intervals. The previous partition is then assessed to find the pointer field for the right most basic interval 77 and a new node is created in the pointer field 79. The new and previous fields are then updated 81.

Figure 18:
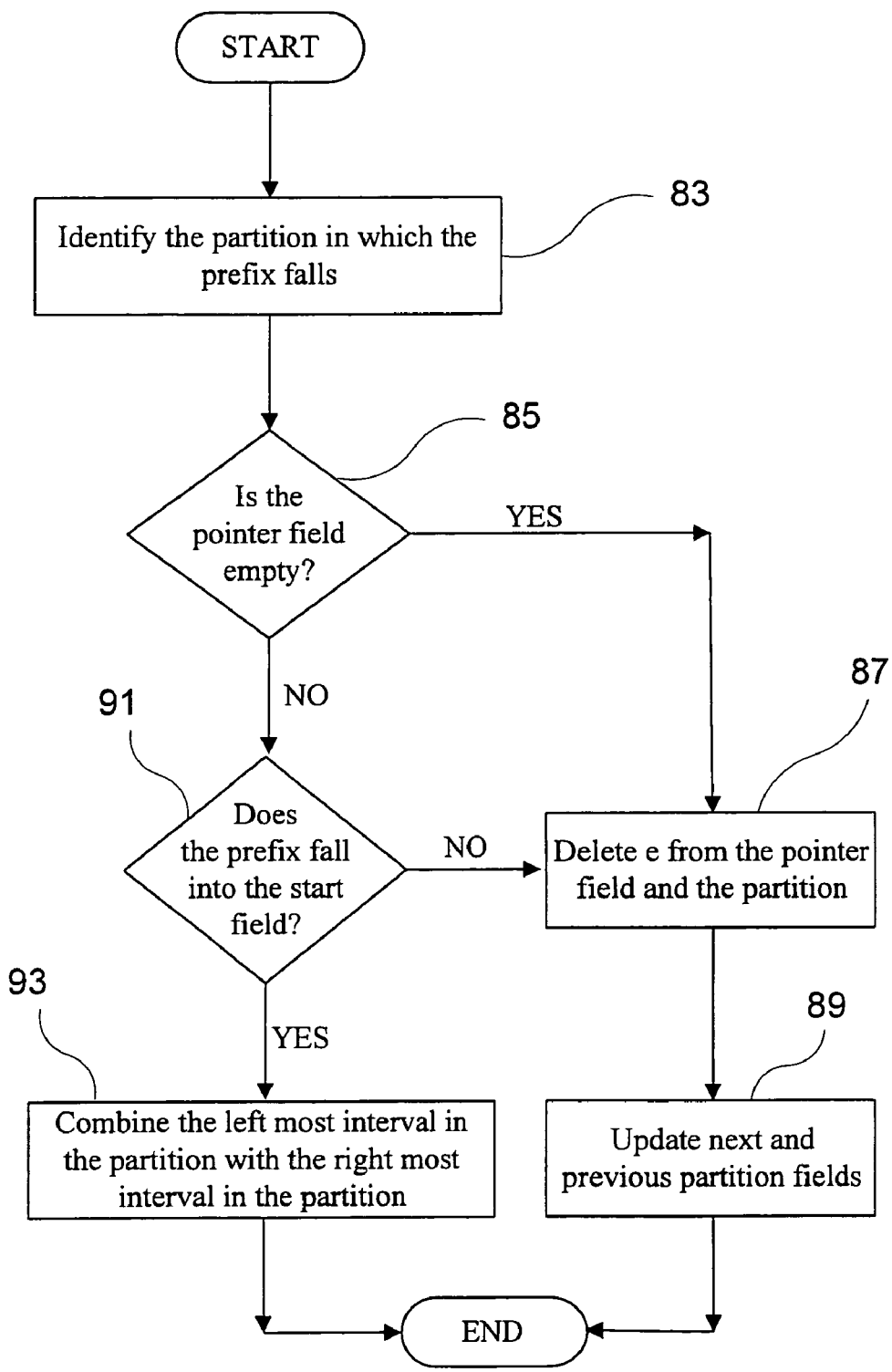
FIG. 18 is a flow chart illustrating the steps of performing the "deletion" router operation using the interval partitioning scheme of the present invention.

As with the insertion operation, the routing operation of deleting a prefix using the interval partitioning scheme of the present invention is performed by removing endpoints from the BIT and/or the back-end prefix tree. With reference to FIG. 18, the partition from which a prefix is to be removed is identified 83. The partition is assessed to determine if the pointer field is empty 85. Should the pointer field not be empty, the prefix is analyzed to determine whether it is located in the start field 91. Should the prefix fall in the start field, the left most interval is combined in the partition with the rightmost interval in the previous partition 93. Where the pointer field is empty, or where the prefix does not fall in the start field, the endpoint of the prefix to be removed is deleted from the pointer field and the partition 87. The next and previous fields are then updated 89.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, programmable logic device, semiconductor memory such as read-only memory (ROM), etc. The article of manufacture containing the computer code may be made and/or used by executing the code directly from one medium, by copying the code from one medium to another medium, or by transferring from one computer readable medium to another computer readable medium.

One skilled in the art of computer science will easily be able to combine the software created as described with appropriate general purpose or special purpose computer hardware, including programmable logic devices, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention. User input may be received from the keyboard, mouse, pen, voice, touch screen, or any other means by which a human can input data into a computer, including through other programs such as application programs.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for improving routing operations in dynamic routing tables comprising:
    (a) establishing s to be used in a prefix partitioning scheme, wherein s denotes a pre-established value of bits of the prefixes;
    (b) partitioning at least one prefix into up to min(n, $2^s+1$) partitions by using the first s bits of each prefix, wherein n is the number of prefixes in a routing table;
    (c) assessing prefix length with regard to s;
    (d) storing the prefix whose length is larger than or equal to s in a partition that corresponds to the value of the prefix's first s bit;
    (e) storing prefixes whose length is smaller than s in a first designated partition; and
    (f) representing the prefixes in each partition using a priority search tree, wherein operation on the priority search tree constitutes defining a rectangle comprising the prefixes associated with a desired destination address.

2. The method according to claim 1, wherein the priority search tree is a red-black priority-search tree (RBPST) that is performed according to the following formula: minXinRectangle($x_{left}$, $X_{right}$, $y_{top}$), wherein $X_{left}$, $X_{right}$, $y_{top}$ are points that lie in a rectangle defined by $X_{left}=d$, $X_{right}=\infty$, $y_{top}=d$, said points are provided by performing the following formula: enumerateRectangle($2^W d-d+2^W-1$, $\infty$, d), wherein d is the destination and W is the number of bits in the destination.

3. The method according to claim 1, wherein the priority search tree is a radix priority-search tree (RPST).

4. The method according to claim 1, further comprising the steps of inserting a new prefix into the priority search tree, wherein every point set of the new prefix set is unique, and representing the new prefix set as the priority search tree.

5. The method according to claim 1, further comprising the step of deleting a prefix from the priority search tree.

6. A computer program product recorded on computer readable medium for routing packets comprising; a computer readable medium for receiving packets specifying prefixes and decision rules for the prefixes; a computer readable medium for establishing s bits to be used in a prefix partitioning scheme; a computer readable medium for matching, inserting, or deleting prefixes in a partitioning tree; and a computer readable medium for performing steps of multilevel partitioning, said steps comprising:
    (a) establishing s to be used in a prefix partitioning scheme, wherein s denotes a pre-established value of bits of the prefixes;
    (b) partitioning at least one prefix into up to min(n, $2^s+1$) partitions by using the first s bits of each prefix, wherein n is the number of prefixes in a routing table;
    (c) assessing prefix length with regard to s;
    (d) storing the prefix whose length is larger than or equal to s in a partition that corresponds to the value of the prefix's first s bit;
    (e) storing prefixes whose length is smaller than s in a first designated partition; and
    (f) representing the prefixes in each partition using a priority search tree, wherein operation on the priority search tree constitutes defining a rectangle comprising the prefixes associated with a desired destination address.

7. The computer program according to claim 6, wherein the priority search tree is a red-black priority-search tree (RBPST) that is performed according to the following formula: minXinRectangle($x_{left}$, $X_{right}$, $y_{top}$), wherein $X_{left}$, $X_{right}$, $y_{top}$ are points that lie in a rectangle defined by $X_{left}=d$, $X_{right}=\infty$, $y_{top}=d$, said points are provided by performing the following formula: enumerateRectangle($2^W d-d+2^W-1$, $\infty$, d), wherein d is the destination and W is the number of bits in the destination.

8. The computer program according to claim 6, wherein the priority search tree is a radix priority-search tree (RPST).

9. The computer program according to claim 6, wherein the computer readable medium further performs the steps of inserting a new prefix into the priority search tree, wherein every point set of the new prefix set is unique, and representing the new prefix set as the priority search tree.

10. The computer program according to claim 6, wherein the computer readable medium further performs the steps of deleting a prefix from the priority search tree.

* * * * *

UNITED STATES PATENT AND TRADEMARK OFFICE
CERTIFICATE OF CORRECTION

PATENT NO.        : 7,474,657 B2
APPLICATION NO.   : 10/718842
DATED             : January 6, 2009
INVENTOR(S)       : Sartaj Kumar Sahni, Haibin Lu and Kun Suk Kim It is certified that error appears in the above-identified patent and that said Letters Patent is hereby corrected as shown below:

Column 2,
Line 57, "O(W long n)" should read --O(W log n)--.
Line 60, "O(W+long n)" should read --O(W + log n)--.

Column 8,

Line 57, " $\sum_{j=0}^{i} s_j$ " should read -- $\sum_{j=0}^{i} s_j$ --.

Column 10,
Line 63, "to keep tack of" should read --to keep track of--.

Column 11,
Line 21, "II. Interval Partitioning According to the" should read
    --II. Interval Partitioning
         According to the--.
Line 53, "r4=16,18], r5=18,19]" should read --r4=[16,18], r5=[18,19]--.

Column 12,
Line 21, "TLPD[i]" should read --TLDP[i]--.

Signed and Sealed this

Twenty-ninth Day of September, 2009

David J. Kappos
*Director of the United States Patent and Trademark Office*